United States Patent
Rozeboom et al.

(10) Patent No.: US 11,873,092 B2
(45) Date of Patent: Jan. 16, 2024

(54) TRIM ACTUATORS FOR HORIZONTAL STABILIZERS AND METHODS OF CONTROLLING HORIZONTAL STABILIZERS

(71) Applicant: The Boeing Company, Chicago, IL (US)

(72) Inventors: Aaron M. Rozeboom, Lake Stevens, WA (US); Morgan S. Parks, Lake Stevens, WA (US)

(73) Assignee: The Boeing Company, Arlington, VA (US)

( * ) Notice: Subject to any disclaimer, the term of this patent is extended or adjusted under 35 U.S.C. 154(b) by 387 days.

(21) Appl. No.: 17/342,808

(22) Filed: Jun. 9, 2021

(65) Prior Publication Data
US 2022/0185448 A1 Jun. 16, 2022

Related U.S. Application Data

(60) Provisional application No. 63/126,076, filed on Dec. 16, 2020.

(51) Int. Cl.
*B64C 13/34* (2006.01)
*B64C 5/16* (2006.01)
(Continued)

(52) U.S. Cl.
CPC .............. *B64C 5/16* (2013.01); *B64C 13/32* (2013.01); *B64C 13/34* (2013.01); *F16H 25/2454* (2013.01); *F16H 2035/005* (2013.01)

(58) Field of Classification Search
CPC ........... B64C 5/16; B64C 13/32; B64C 13/34; F16H 25/2454; F16H 2035/005
See application file for complete search history.

(56) References Cited

U.S. PATENT DOCUMENTS 5,582,390 A * 12/1996 Russ ................. B64C 13/28
244/99.2
5,944,148 A * 8/1999 Bae ................... B64C 13/34
188/134

(Continued)

FOREIGN PATENT DOCUMENTS

CN 115817791 A * 3/2023
EP 2955104 A1 * 12/2015 ........... B64C 13/341

OTHER PUBLICATIONS

SAE Aerospace: Aerospace Information Report, Trimmable Horizontal Stabilizer Actuator Descriptions (Sep. 2011).

*Primary Examiner* — Randell J Krug
(74) *Attorney, Agent, or Firm* — Walters & Wasylyna LLC

(57) ABSTRACT

A trim actuator for a horizontal stabilizer comprises a power screw, a rotary actuator, configured to rotate the power screw, and a nut, configured to translate along the power screw when the power screw is rotated. Trim actuator also comprises an anti-back-drive mechanism, configured to prevent the power screw from rotating in a first rotational direction when a first force is applied to the nut in a first axial direction and to prevent the power screw from rotating in a second rotational direction, opposite the first rotational direction, when a second force is applied to the nut in a second axial direction. Trim actuator further comprises a sensor, configured to measure internal loading of the anti-back-drive mechanism when the first force is applied to the nut in the first axial direction or when the second force is applied to the nut in the second axial direction.

20 Claims, 11 Drawing Sheets

(51) Int. Cl.
  *B64C 13/32*     (2006.01)
  *F16H 25/24*    (2006.01)
  *F16H 35/00*     (2006.01)

(56) References Cited

U.S. PATENT DOCUMENTS

| | | | | |
|---|---|---|---|---|
| 6,109,415 | A * | 8/2000 | Morgan | B64C 13/28 |
| | | | | 192/223.1 |
| 6,722,485 | B1 * | 4/2004 | Gitnes | F16H 25/2021 |
| | | | | 192/223.1 |
| 8,496,204 | B1 * | 7/2013 | Charafeddine | B64C 13/505 |
| | | | | 244/99.4 |
| 8,918,291 | B2 | 12/2014 | Tallot et al. | |
| 10,040,539 | B2 | 8/2018 | Antunes et al. | |
| 10,065,728 | B2 | 9/2018 | Cyrot | |
| 10,234,012 | B1 * | 3/2019 | Latif | F16H 25/2204 |
| 10,974,846 | B2 * | 4/2021 | Hale | B64D 45/00 |
| 11,628,926 | B2 * | 4/2023 | Polcuch | B64C 13/16 |
| | | | | 244/99.2 |
| 11,629,780 | B2 * | 4/2023 | Lin | F16H 25/2454 |
| | | | | 74/89.39 |
| 2008/0000730 | A1 * | 1/2008 | Port-Robach | F16H 25/2454 |
| | | | | 244/99.2 |
| 2016/0297514 | A1 * | 10/2016 | Turpin | F16H 25/2454 |
| 2016/0369877 | A1 * | 12/2016 | Gitnes | F16H 25/2454 |
| 2022/0126982 | A1 * | 4/2022 | Kulkarni | F16D 59/00 |
| 2022/0324551 | A1 * | 10/2022 | Haserodt | B64C 9/04 |

* cited by examiner

TRIM ACTUATORS FOR HORIZONTAL STABILIZERS AND METHODS OF CONTROLLING HORIZONTAL STABILIZERS

PRIORITY

This application claims priority from U.S. Ser. No. 63/126,076 filed on Dec. 16, 2020.

TECHNICAL FIELD

Described herein are horizontal-stabilizer trim actuators and methods for controlling and monitoring horizontal stabilizers using such trim actuators.

BACKGROUND

Modern aircraft are equipped with a horizontal stabilizer. In certain aircraft, the inclination ("trim") of the horizontal stabilizer is adjustable. Trim of the horizontal stabilizer is adjusted to compensate for aerodynamic loads, applied to the horizontal stabilizer to maintain the desired trajectory of the aircraft while preventing the pilot from having to apply a compensating force continuously on associated controls.

Adjustment of the inclination of the horizontal stabilizer is controlled during flight by an actuator. The actuator is subjected to a load, resulting from the aerodynamic load, received by the horizontal stabilizer. This load can cause progressive and undesired motion of the actuator, which can lead to a variation of the inclination of the horizontal stabilizer. In order to avoid such an involuntary variation and to maintain effective control of the adjustable horizontal stabilizer, the actuator can be provided with an irreversibility function.

The integrity of the irreversibility function is to be verified to ensure aircraft safety. However, because the irreversibility function is integrated within the actuator, a functional test, aimed at directly verifying the integrity of the irreversibility function of the actuator is difficult and laborious, which can increase aircraft downtime.

SUMMARY

Accordingly, apparatuses and methods, intended to address at least the above-identified concerns, would find utility.

The following is a non-exhaustive list of examples of the subject matter, disclosed herein.

Disclosed herein is a trim actuator for a horizontal stabilizer of an aircraft. The trim actuator comprises a power screw, a rotary actuator, configured to rotate the power screw, and a nut, configured to translate along the power screw when the power screw is rotated by the rotary actuator. The trim actuator also comprises an anti-back-drive mechanism, configured to prevent the power screw from rotating in a first rotational direction when a first force is applied to the nut in a first axial direction along the power screw and also configured to prevent the power screw from rotating in a second rotational direction, opposite the first rotational direction, when a second force is applied to the nut in a second axial direction, opposite the first axial direction. The trim actuator further comprises a sensor, configured to measure internal loading of the anti-back-drive mechanism when the first force is applied to the nut in the first axial direction along the power screw or when the second force is applied to the nut in the second axial direction, opposite the first axial direction.

The power screw, the rotary actuator, and the nut of the trim actuator facilitate selectively controlled motion of the horizontal stabilizer. The anti-back-drive mechanism prevents rotational back-drive of the power screw, while enabling rotational motion driven by the rotary actuator. Measurement of the internal loading of the anti-back-drive mechanism by the sensor provides a means for monitoring structural health of the anti-back-drive mechanism.

Also disclosed herein is a method of using the trim actuator to control the horizontal stabilizer of the aircraft. The method comprises steps of: (1) frictionally coupling the power screw with the anti-back-drive mechanism to prevent rotation of the power screw in the first rotational direction when the first force is applied to the nut in the first axial direction along the power screw; (2) frictionally coupling the power screw with the anti-back-drive mechanism to prevent rotation of the power screw in the second rotational direction, opposite the first rotational direction, when the second force is applied to the nut in the second axial direction, opposite the first axial direction; and (3) measuring the internal loading of the anti-back-drive mechanism when the first force is applied to the nut in the first axial direction along the power screw and when the second force is applied to the nut in the second axial direction, opposite the first axial direction, using the sensor.

Frictionally coupling the power screw with the anti-back-drive mechanism facilitates irreversibility of the power screw, while enabling actuator-driven rotational motion of the power screw. Measurement of the internal loading of the anti-back-drive mechanism by the sensor provides a means for monitoring structural health of the anti-back-drive mechanism.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1:
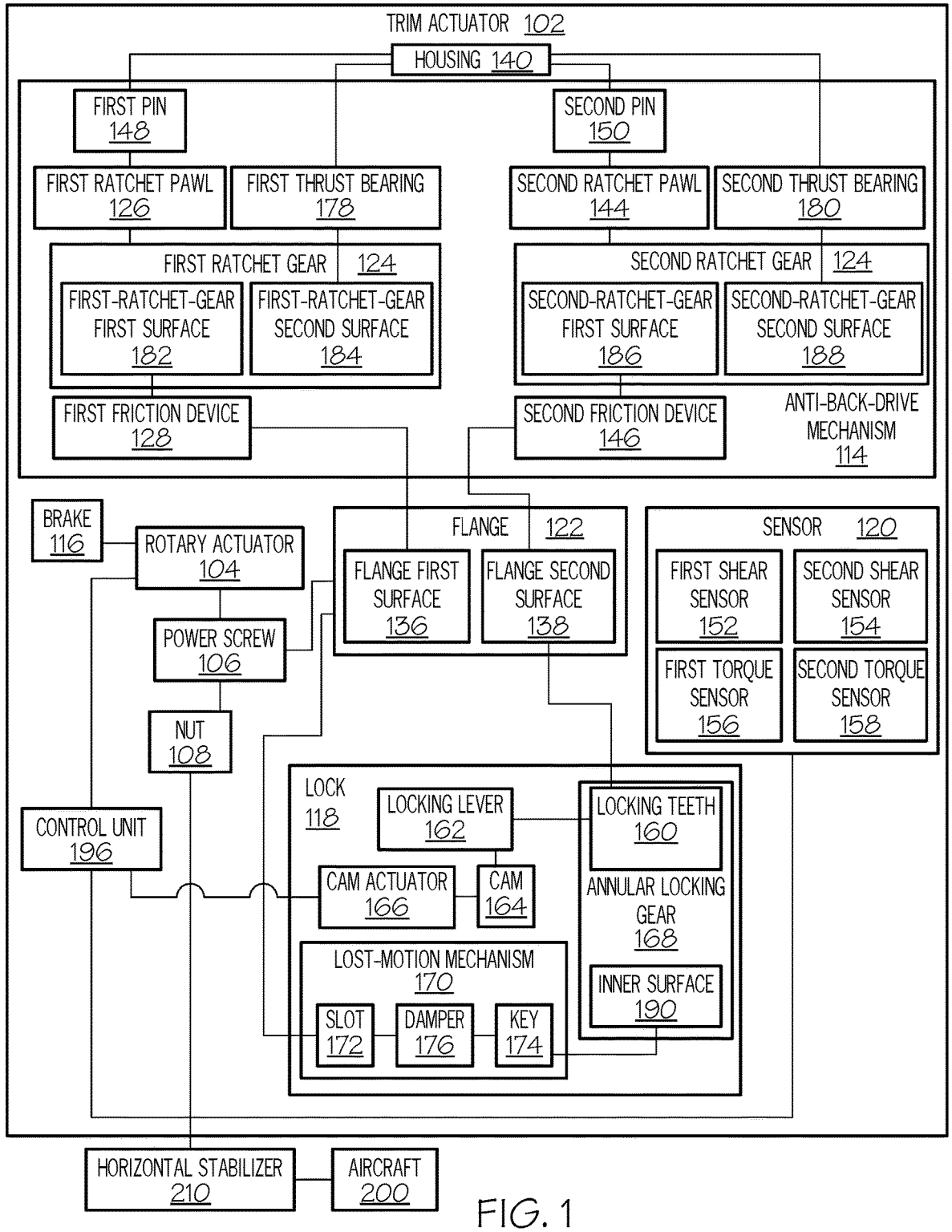
FIG. 1 is a block diagram of a trim actuator for a horizontal stabilizer of an aircraft, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIGS. 1-8 and 11 may be combined in various ways without the need to include other features described in FIGS. 1-8 and 11, other drawing figures, and/or the accompanying disclosure, even though such combination or combinations are not explicitly illustrated herein. Similarly, additional features not limited to the examples presented, may be combined with some or all of the features shown and described herein.

Figure 9:
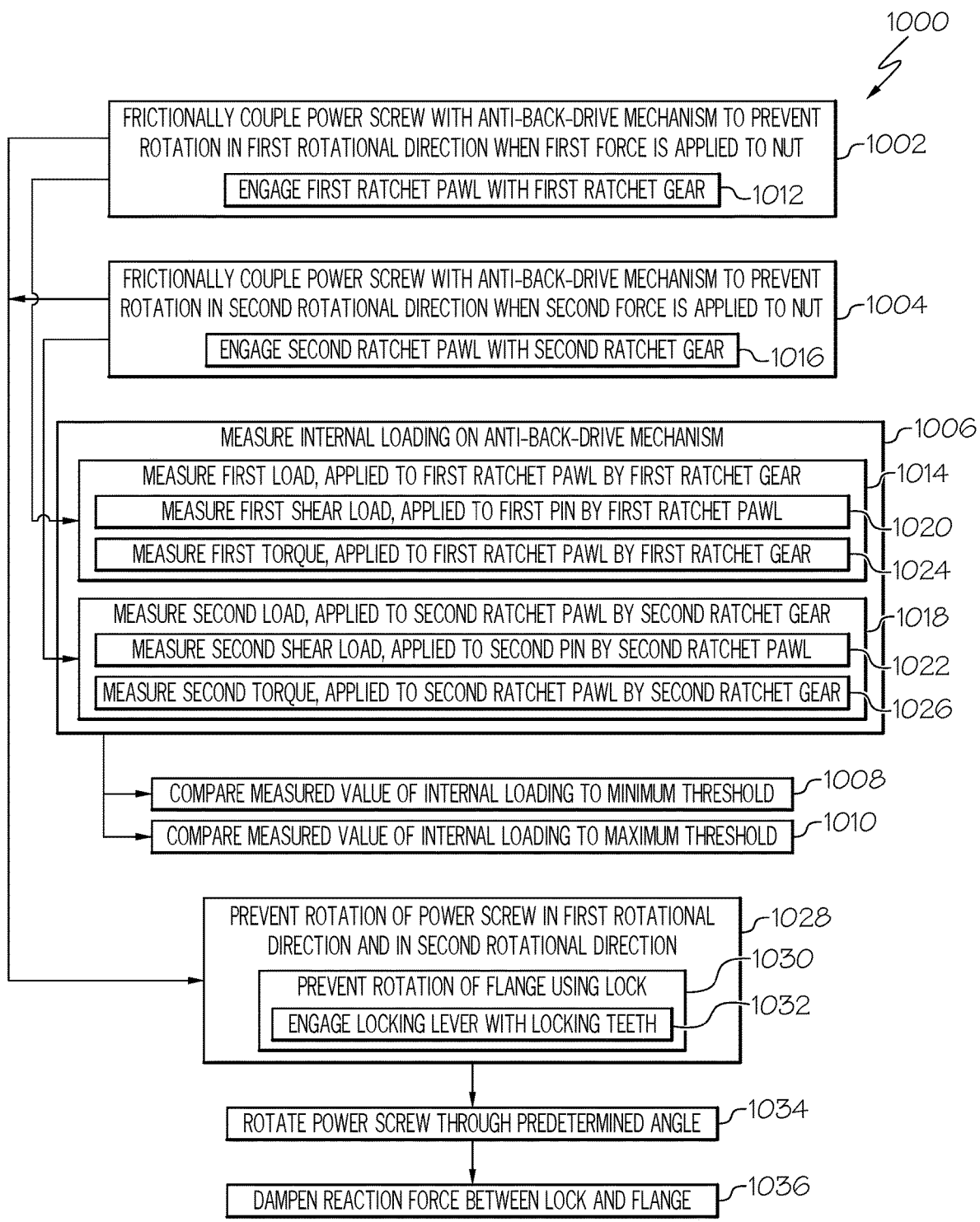
FIG. 9 is a block diagram of a method, according to one or more examples of the subject matter, disclosed herein, of controlling the horizontal stabilizer utilizing the trim actuator of FIG. 1, according to one or more examples of the subject matter, disclosed herein.
Figure 10:
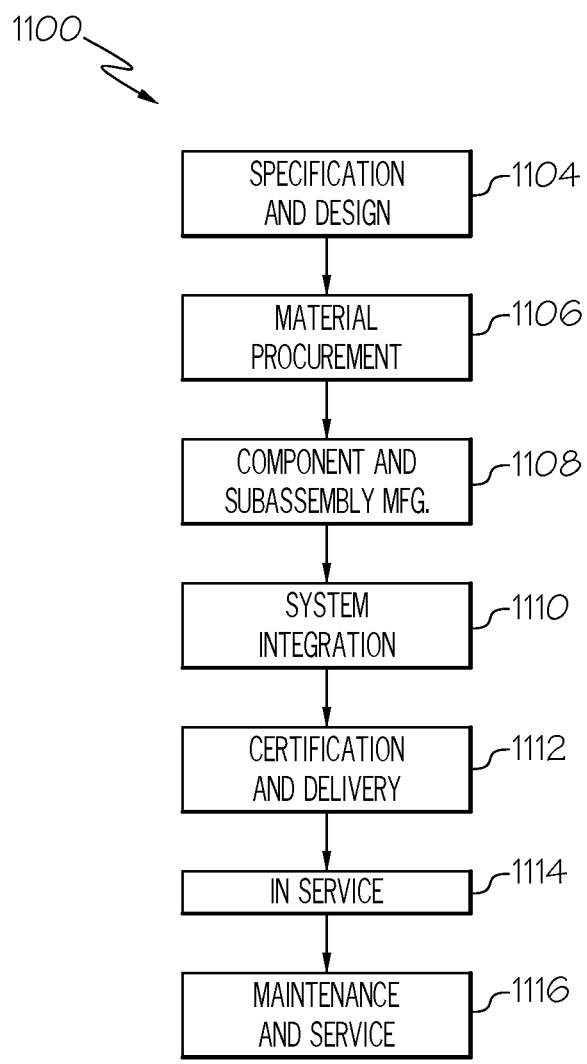
FIG. 10 is a block diagram of aircraft production and service methodology.

In FIGS. 9 and 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 9 and 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIG. 1 and particularly to, e.g., FIGS. 2-6 for illustrative purposes only and not by way of limitation, the following portion of this paragraph delineates example 1 of the subject matter, disclosed herein. According to example 1, trim actuator 102 for horizontal stabilizer 210 of aircraft 200 comprises power screw 106, rotary actuator 104, configured to rotate power screw 106, and nut 108, configured to translate along power screw 106 when power screw 106 is rotated by rotary actuator 104. Trim actuator 102 also comprises anti-back-drive mechanism 114, configured to prevent power screw 106 from rotating in a first rotational direction when a first force is applied to nut 108 in a first axial direction along power screw 106 and also configured to prevent power screw 106 from rotating in a second rotational direction, opposite the first rotational direction, when a second force is applied to nut 108 in a second axial direction, opposite the first axial direction. Trim actuator 102 further comprises sensor 120, configured to measure internal loading of anti-back-drive mechanism 114 when the first force is applied to nut 108 in the first axial direction along power screw 106 or when the second force is applied to nut 108 in the second axial direction, opposite the first axial direction.

Power screw 106, rotary actuator 104, and nut 108 of trim actuator 102 facilitate selectively controlled motion of horizontal stabilizer 210. Anti-back-drive mechanism 114 prevents rotational back-drive of power screw 106 (e.g., prevides irreversibility), while enabling rotational motion driven by rotary actuator 104. Measurement of the internal loading of anti-back-drive mechanism 114 by sensor 120 provides a means for monitoring structural health of anti-back-drive mechanism 114.

Trim actuator 102 is configured to controllably adjust inclination of horizontal stabilizer 210. Trim actuator 102 is also be known as, or referred to as, a horizontal-stabilizer trim actuator (HSTA). Trim actuator 102 can be controlled during flight in a manual mode or under automatic pilot to adjust the inclination of horizontal stabilizer 210.

Rotary actuator 104 provides power for commanded rotation of power screw 106. In one or more examples, rotary actuator 104 is any suitable drive motor, such as a hydraulic motor or an electric motor. In one or more examples, trim actuator 102 includes a gearbox that is configured to amplify the power produced by rotary actuator 104 into a desired torque and/or speed.

Figure 2:
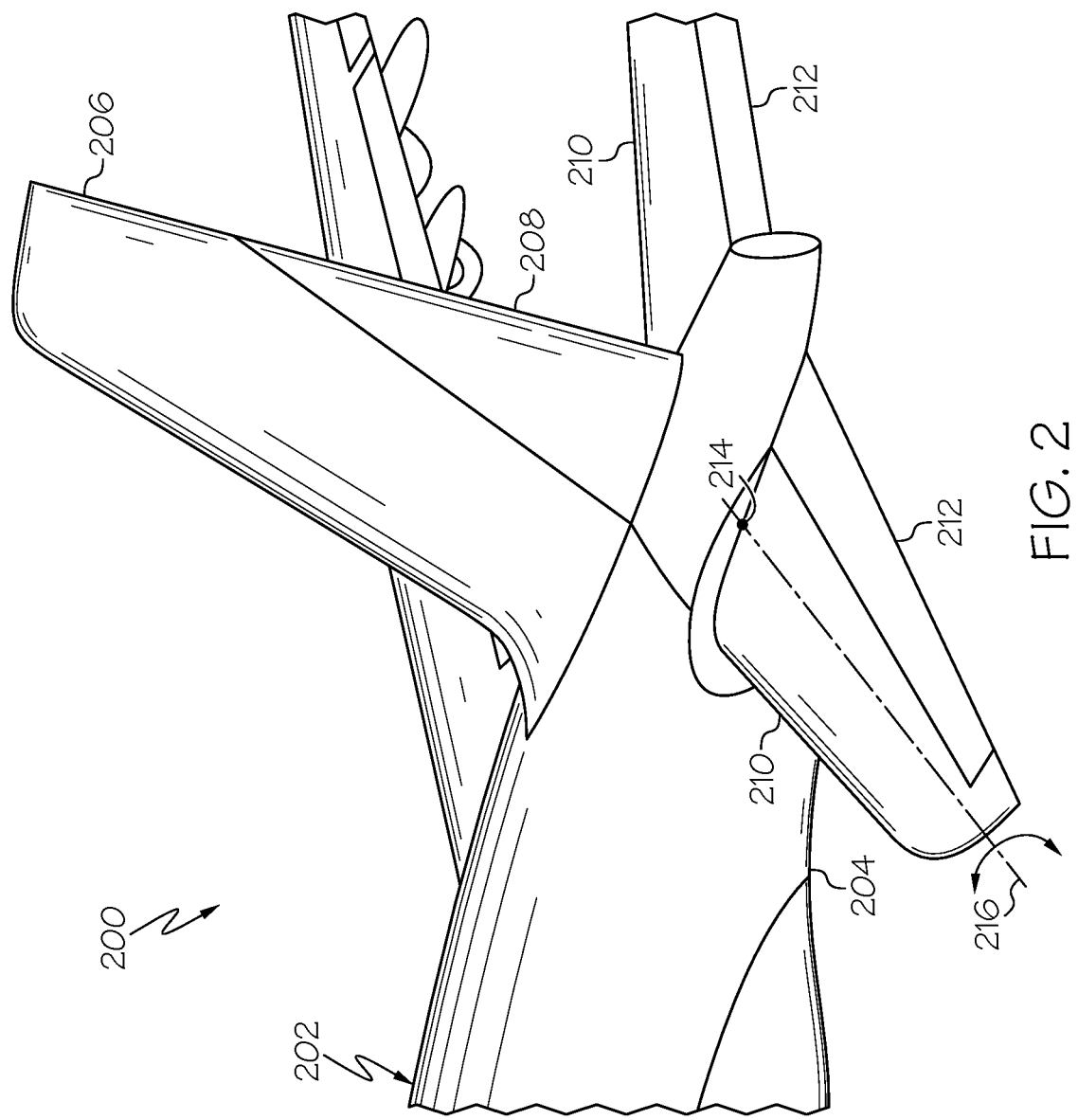
FIG. 2 is a schematic, perspective view of a portion of the aircraft and horizontal stabilizers of FIG. 1, according to one or more examples of the subject matter, disclosed herein.
Figure 3:
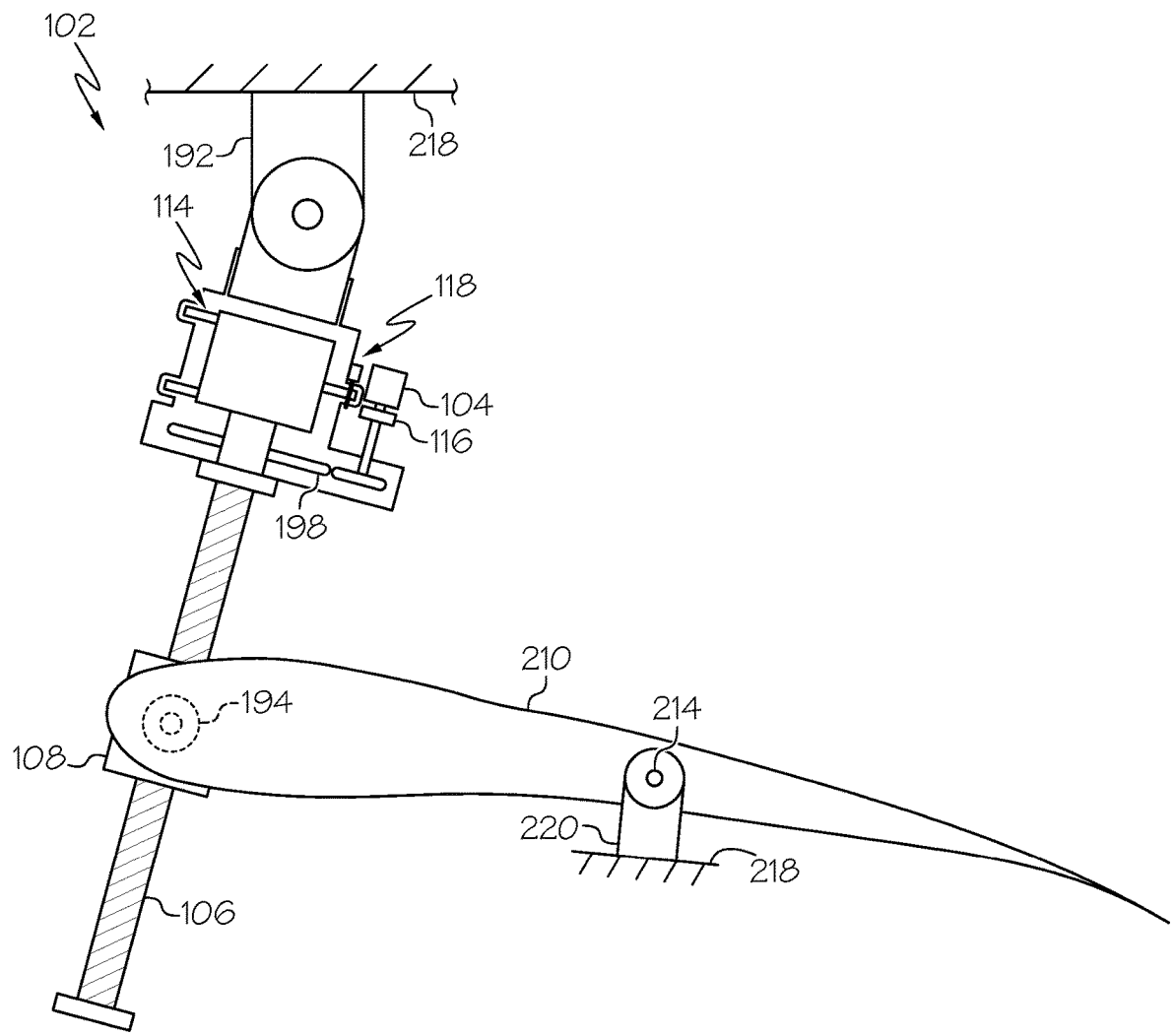
FIG. 3 is a schematic, elevation view of the trim actuator and the horizontal stabilizer of FIG. 1, according to one or more examples of the subject matter, disclosed herein.

Power screw 106 and nut 108 provide a mechanical linkage of variable length between a fixed structure of aircraft 200 and horizontal stabilizer 210. Rotation of power screw 106 by rotary actuator 104, and associated gears, causes translation of nut 108 and, thus, tilting of horizontal stabilizer 210 about a horizontal axis (e.g., pivot axis 216 as shown in FIG. 2) in one direction or the other, depending on the inputs applied to rotary actuator 104. Power screw 106 converts rotational power into linear power. Nut 108 transfers linear power from power screw 106 to horizontal stabilizer 210 (e.g., as shown in FIGS. 2 and 3).

Examples of power screw 106 and nut 108 include a ball screw/nut assembly, a lead screw/nut assembly, an ACME screw/nut assembly, and other assemblies suitable for use as a horizontal-stabilizer trim actuator. Relative rotational members that incorporate balls or rollers offer higher stiffness, lighter weight, lower cost, good mechanical operating efficiency and/or greater packaging flexibility.

Anti-back-drive mechanism 114 is a bi-directional load path lock that operates under compression loads, such as when the first force is applied to nut 108 in the first axial direction along power screw 106, and tension loads, such as when the second force is applied to nut 108 in the second axial direction, imposed on trim actuator 102 by horizontal stabilizer 210. The purpose of anti-back-drive mechanism 114 is to prevent an opposing load from reversing trim actuator 102. Anti-back-drive mechanism 114 is a passive braking system that always opposes (e.g., resists) back-driven rotation of power screw 106 in one of the first rotational direction or the second rotational direction, depending upon a direction of a load, acting on trim actuator 102.

In one or more examples, during flight, trim actuator 102 is subjected to a load, resulting from the distribution of aerodynamic loads on horizontal stabilizer 210. In one or more examples, this aerodynamic load is transmitted to nut 108 and then to power screw 106. Thus, the load, applied to power screw 106 by nut 108 has an axial component and a radial component. The radial component of the load tends to urge progressive and undesired rotation of power screw 106 (i.e., back-driven rotation of power screw 106), which would lead to an unintentional variation of the inclination of horizontal stabilizer 210.

Anti-back-drive mechanism 114 prevents the back-driven rotation of power screw 106 and, thus, unintentional variation of the inclination of horizontal stabilizer 210. Therefore, anti-back-drive mechanism 114 provides an irreversibility function to trim actuator 102. Anti-back-drive mechanism 114 is also configured to enable rotation of power screw 106 driven by rotary actuator 104. Anti-back-drive mechanism 114 is also be known as, or referred to as, a no-back device, an anti-return device, a brake with anti-displacement system, or a no-back brake.

It can be appreciated that trim actuator 102 primarily experiences a compressive load, for example, when the first force is applied to nut 108 in the first axial direction along power screw 106, which tends to urge back-driven rotation of power screw 106 in the first rotational direction. Trim actuator 102 also experiences a tensile load, for example, when the second force is applied to nut 108 in the second axial direction along power screw 106, which tends to urge back-driven rotation of power screw 106 in the second rotational direction.

It is desirable to verify the integrity and/or structural and functional health of anti-back-drive mechanism 114. In a conventional horizontal-stabilizer trim actuator, verification of the integrity and/or structural and functional health of an anti-back-drive mechanism, which provides the irreversibility function to the horizontal-stabilizer trim actuator, requires manual inspection or complex on-the-ground testing of the horizontal-stabilizer trim actuator and the anti-back-drive mechanism. One purpose of trim actuator 102, disclosed herein, is to provide a functional test, aimed at directly verifying the integrity and/or structural and functional health of anti-back-drive mechanism 114 by measuring the internal loading of anti-back-drive mechanism 114 along a primary load path from horizontal stabilizer 210, through trim actuator 102, and to aircraft 200. Therefore, the components and features of trim actuator 102, described by examples herein, such as sensor 120, beneficially improve detection of improper operation of anti-back-drive mechanism 114, reduce the time and labor, related to periodic testing and inspection of anti-back-drive mechanism 114, and/or improves the availability of aircraft 200.

The internal loading of anti-back-drive mechanism 114 is a result of mechanical engagement between anti-back-drive mechanism 114 and power screw 106 while anti-back-drive mechanism 114 is opposing and reacting to the back-driven rotation of power screw 106 when the first force is applied to nut 108 in the first axial direction along power screw 106 or when the second force is applied to nut 108 in the second axial direction. Sensor 120 is any suitable device or plurality of devices that is configured to measure the internal loading condition or detect a change in the internal loading condition of anti-back-drive mechanism 114. Sensor 120 is also configured to generate and convey signals to control unit 196 (FIG. 1), the pilot, automatic flight-control system, and/or flight log indicating detection (or non-detection) of the internal loading of anti-back-drive mechanism 114. In one or more examples, sensor 120 continuously measures the internal loading of anti-back-drive mechanism 114. In one or more examples, sensor 120 intermittently measures the internal loading of anti-back-drive mechanism 114, such as at regular intervals or via initiation by the pilot.

FIG. 2 schematically illustrates rear portion 204 (e.g., tail portion) of fuselage 202 of aircraft 200. Rear portion 204 of fuselage 202 includes tail fin 206 and horizontal stabilizer 210 on either side of tail fin 206. Tail fin 206 supports rudder 208. Horizontal stabilizer 210 supports elevator 212. Horizontal stabilizer 210 is pivotally mounted to fuselage 202 at pivot point 214 so that it can be pivoted about pivot axis 216 to adjust the longitudinal pitch (e.g., "trim") of aircraft 200.

Horizontal stabilizer 210 provides pitch stability to aircraft 200. During flight, horizontal stabilizer 210 is adjusted by trim actuator 102 (e.g., as shown in FIG. 3), which moves a leading edge of horizontal stabilizer 210 upward or downward relative to pivot axis 216. Horizontal stabilizer 210 that is trimmable provides an adjustable flight-control surface in which an entirety of horizontal stabilizer 210 is moved by trim actuator 102. Typically, horizontal stabilizers on both sides of tail fin 206 are moved together. When the leading edges of the horizontal stabilizers move up, a nose of aircraft 200 goes down. When the leading edges of the horizontal stabilizers move down, the nose of aircraft 200 goes up. In one or more examples, adjustments of horizontal stabilizer 210 are automatically controlled directly from flight computers of aircraft 200, such as an automatic flight-control unit, and/or is manually controlled by pilot input.

FIG. 3 schematically illustrates trim actuator 102 for selectively controlling the inclination (position) of horizontal stabilizer 210. It can be appreciated that the principles and examples of trim actuator 102 provided herein are also applicable to other adjustable flight-control surfaces. Generally, trim actuator 102 provides a primary load path between support structure 218 of fuselage 202 and horizontal stabilizer 210. Nut 108 is connected by threads to power screw 106. In one or more examples, power screw 106 extends approximately vertically and is connected at a first end (e.g., an upper end) to rotary actuator 104, such as via gear assembly 198 or other power transmission component. In one or more examples, power screw 106 includes an end cap that is fixed to a second end (e.g., a lower end), opposite the first end, to assure that power screw 106 will not be unthreaded from nut 108.

In one or more examples, trim actuator 102 is coupled to support gimbal 192 that is pivotably coupled at a fixed position to support structure 218, such as a portion of the rear portion 204 of the fuselage 202 (e.g., FIG. 2). Rotary actuator 104, gear assembly 198, power screw 106, and nut 108 and the details thereof are of a well-known construction and, thus, are only generally shown and described for purposes of simplicity and brevity.

In one or more examples, horizontal stabilizer 210 is coupled along its length and is pivotable relative to pivot structure 220 that is coupled at a fixed position to support structure 218. A forward end (e.g., proximate the leading edge) of horizontal stabilizer 210 is coupled to and is pivotable relative to drive gimbal 194, which is in turn pivotally coupled to nut 108.

FIG. 1 schematically illustrates trim actuator 102 and horizontal stabilizer 210. In one or more examples, to selectively set the position of horizontal stabilizer 210, the pilot, for example, through operation of control unit 196 (FIG. 1), energizes rotary actuator 104 and gear assembly 198 to rotate power screw 106 in one of the first rotational direction or the second rotational direction, which will, in turn, move nut 108 and drive gimbal 194 in a respective one of the first axial direction or the second axial direction along power screw 106 to pivot the forward end of horizontal stabilizer 210 upward or downward, respectively. As this occurs, trim actuator 102 can pivot at support gimbal 192 and can pivot at drive gimbal 194 to accommodate the angular, arcuate displacement of the forward end of horizontal stabilizer 210. Control devices, such as control unit 196 are generally well known and, thus, details thereof have been omitted for the purposes of brevity and simplicity, except where discussed further below.

Figure 4:
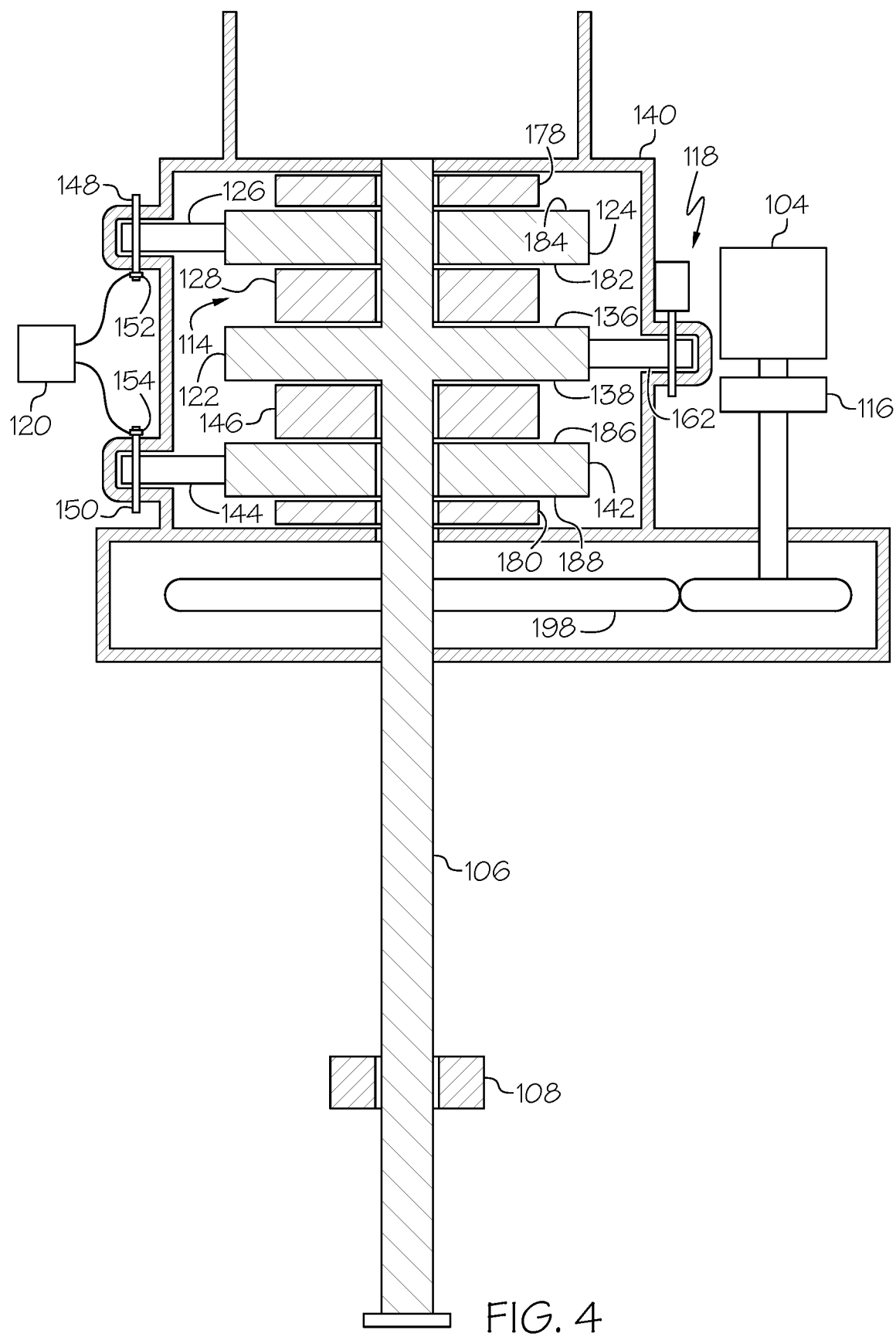
FIG. 4 is a schematic, elevation, partial sectional view of the trim actuator of FIG. 1, according to one or more examples of the subject matter, disclosed herein.

Referring generally to FIG. 1 and particularly to, e.g., FIGS. 2-4 for illustrative purposes only and not by way of limitation, the following portion of this paragraph delineates example 2 of the subject matter, disclosed herein. According to example 2, which encompasses example 1, above, trim actuator 102 further comprises brake 116, configured to prevent power screw 106 from rotating upon deactivation of rotary actuator 104.

Brake 116 provides redundant prevention of rotational back-drive of power screw 106 (e.g., provides a redundant irreversibility function), such as when rotary actuator 104 is not actively driving rotational motion of power screw 106.

In one or more examples, the irreversibility function of trim actuator 102 is redundantly designed by utilization of brake 116. In one or more examples, brake 116 operates in parallel or series with anti-back-drive mechanism 114. Brake 116 is any suitable device, such as a motor brake, designed to work with rotary actuator 104 to stop and/or hold the driven load. In one or more examples, brake 116 is configured to stop and hold power screw 106 at an output of rotary actuator 104.

In one or more examples, brake 116 uses friction between mating surfaces to stop and/or hold the load and, thus, prevent rotation of power screw 106 in both the first rotation direction and the second rotational direction. Actuation (e.g., engagement and release) of brake 116 is provided through any suitable means, such as through electrical, mechanical, pneumatic, or hydraulic methods. In one or more examples, actuation of brake 116 is commanded, for example, under direction from control unit 196 (FIG. 1). In one or more examples, brake 116 provides fail-safe operation by automatically engaging when power is removed from rotary actuator 104, thereby holding the driven load and preventing rotation of power screw 106. When power is applied (e.g., restored) to rotary actuator 104, brake 116 automatically releases, thereby permitting rotation of power screw 106 driven by rotary actuator 104. Brake 116 is also be known as, or referred to as, a power-off brake.

Figure 5:
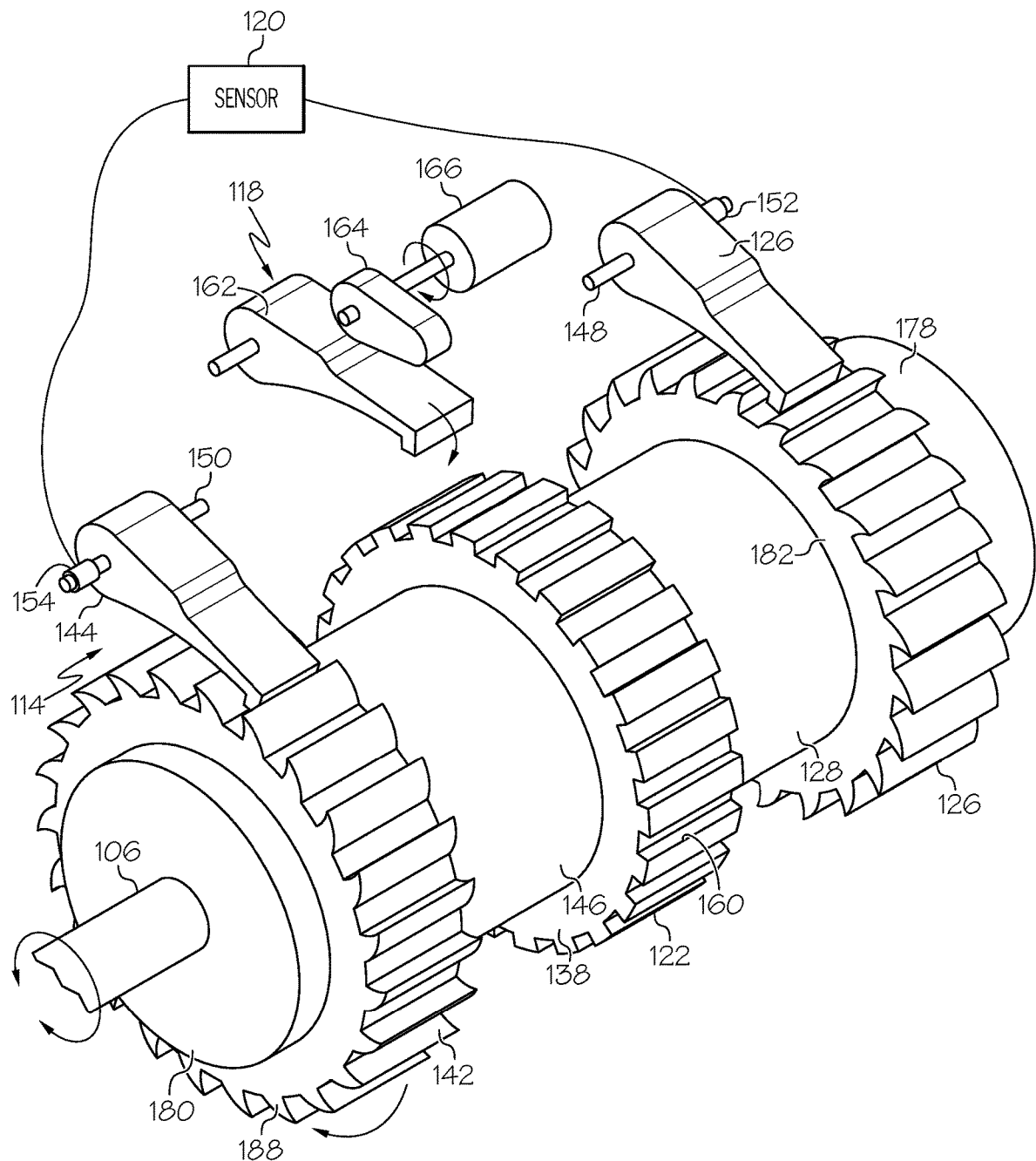
FIG. 5 is a schematic, perspective view of a portion of the trim actuator of FIG. 1, according to one or more examples of the subject matter, disclosed herein.
Figure 6:
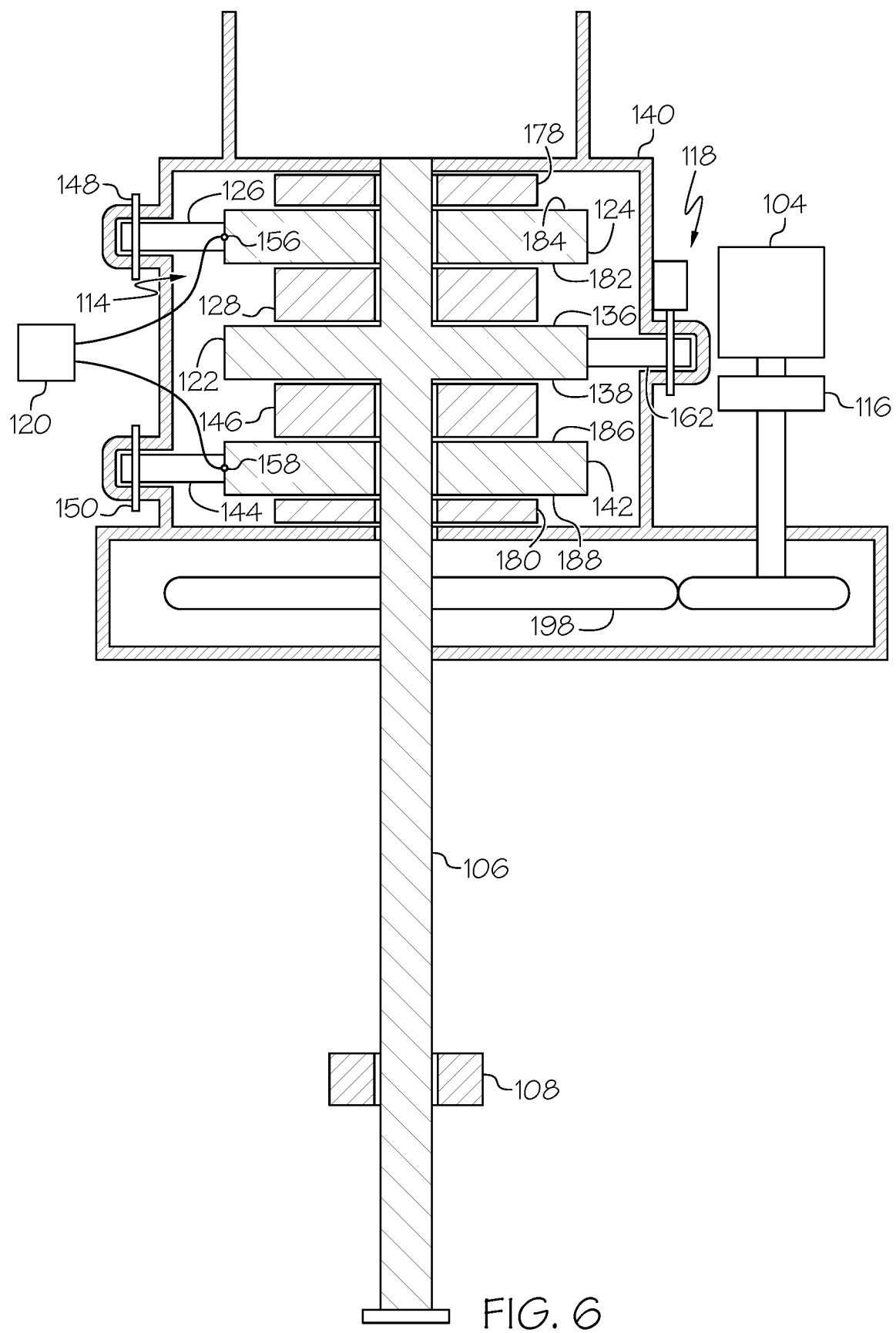
FIG. 6 is a schematic, elevation, partial sectional view of the trim actuator of FIG. 1, according to one or more examples of the subject matter, disclosed herein.

Referring generally to FIG. 1 and particularly to, e.g., FIGS. 4-6 for illustrative purposes only and not by way of limitation, the following portion of this paragraph delineates example 3 of the subject matter, disclosed herein. According to example 3, which encompasses example 1 or 2, above, sensor 120 is configured to detect when the internal loading of anti-back-drive mechanism 114 is below a minimum predetermined load-magnitude threshold.

Detection of when the internal loading is below the minimum load-magnitude threshold provides an indication the irreversibility function provided by anti-back-drive mechanism 114 is improperly operating.

Measuring the internal loading of anti-back-drive mechanism 114 enables direct verification of the integrity, health, and proper operation of anti-back-drive mechanism 114 and, thus, the irreversibility function provided by anti-back-drive mechanism 114. In one or more examples, improper operation of anti-back-drive mechanism 114 is detected when a value representative of a magnitude of the internal loading of anti-back-drive mechanism 114, measured by sensor 120, is below the minimum predetermined load-magnitude threshold.

A value, representative of the magnitude of the internal loading of anti-back-drive mechanism 114, measured by sensor 120, being below the minimum predetermined load-magnitude threshold can provide a real-time indication that anti-back-drive mechanism 114 is no longer properly opposing the back-driven rotation of power screw 106 and, thus, is no longer preventing rotation of power screw 106 or holding the inclination of horizontal stabilizer 210. In one or more examples, an indication that the internal loading of anti-back-drive mechanism 114 is below the minimum predetermined load-magnitude threshold, as detected by sensor 120, triggers an alarm or alert to the pilot or instigates further inspection and/or service of trim actuator 102 and/or anti-back-drive mechanism 114 upon landing of aircraft 200.

Accordingly, detecting when the internal loading of anti-back-drive mechanism 114 is below the minimum predetermined load-magnitude threshold provides a real-time, in-flight indication that anti-back-drive mechanism 114 is not properly operating under flight conditions. This indication also beneficially reduces costs and downtime of aircraft 200 associated with routine maintenance and physical inspections of trim actuator 102.

The purpose of the minimum predetermined load-magnitude threshold is to avoid untimely detection of improper operation, such as when anti-back-drive mechanism 114 is operating with relatively small internal loads. Use of the minimum predetermined load-magnitude threshold also alleviates potential uncertainties in the measurement of load values, such as due to fluctuations of behavior resulting from external conditions during flight.

Additionally, parameters relating to particular conditions of normal operation of trim actuator 102 can be taken into account when measuring the internal loading of anti-back-drive mechanism 114. In one or more examples, the detection of the internal loading of anti-back-drive mechanism 114 can be temporarily inhibited as a function of a parameter, related to reversal of the direction of rotational movement of power screw 106. In one or more examples, detection of the internal loading of anti-back-drive mechanism 114 can be temporarily inhibited as a function of a parameter, related to engagement and/or release of brake 116.

Referring generally to FIG. 1 and particularly to, e.g., FIGS. 4-6 for illustrative purposes only and not by way of limitation, the following portion of this paragraph delineates example 4 of the subject matter, disclosed herein. According to example 4, which encompasses any one of examples 1 to 3, above, sensor 120 is configured to detect when the internal loading of anti-back-drive mechanism 114 is above a maximum predetermined load-magnitude threshold.

Detection of when the internal loading is above the maximum predetermined load-magnitude threshold provides a basis for analysis of the service life of anti-back-drive mechanism 114.

In one or more examples, measuring the internal loading of anti-back-drive mechanism 114 also facilitates prediction of improper operation of anti-back-drive mechanism 114 and, thus, the irreversibility function provided by anti-back-drive mechanism 114. In one or more examples, the probability of improper operation is determined based on a statistical analysis of anti-back-drive mechanism 114 when a value, representative of the magnitude of the internal loading of anti-back-drive mechanism 114, measured by sensor 120, is above the maximum predetermined load-magnitude threshold.

In one or more examples, a value representative of the magnitude of the internal loading of anti-back-drive mechanism 114, measured by sensor 120, being above the maximum predetermined load-magnitude threshold can provide an indication that anti-back-drive mechanism 114 has experienced a load or shock above that for which anti-back-drive mechanism 114 was designed. In one or more examples, an indication that the internal loading of anti-back-drive mechanism 114 is above the maximum predetermined load-magnitude threshold, as detected by sensor 120, triggers an alarm or alert to the pilot or instigates further inspection and/or service of trim actuator 102 and/or anti-back-drive mechanism 114 upon landing of aircraft 200.

Accordingly, detecting when the internal loading of anti-back-drive mechanism 114 is above the maximum predetermined load-magnitude threshold provides a basis for obtaining a statistical breakdown of anti-back-drive mechanism 114. This statistical breakdown can beneficially be used to predict the service life of trim actuator 102 when experiences internal loading above the maximum predetermined load-magnitude threshold.

The purpose of the maximum predetermined load-magnitude threshold is to avoid untimely detection of large internal loading, such as when anti-back-drive mechanism 114 is operating with normal or expected internal loads. In one or more examples, use of the maximum predetermined load-magnitude threshold also alleviates potential uncertainties in the measurement of load values, such as due to fluctuations of behavior resulting from external conditions during flight.

Referring generally to FIG. 1 and particularly to, e.g., FIGS. 2-5 for illustrative purposes only and not by way of limitation, the following portion of this paragraph delineates example 5 of the subject matter, disclosed herein. According to example 5, which encompasses any one of examples 1 to 4, above, trim actuator 102 further comprises flange 122, concentric with power screw 106 and fixed to power screw 106 so that flange 122 rotates with power screw 106. Trim actuator 102 additionally comprises housing 140 that contains flange 122 and anti-back-drive mechanism 114. Flange 122 comprises flange first surface 136 and flange second surface 138, opposite flange first surface 136. Anti-back-drive mechanism 114 comprises first ratchet gear 124, concentrically mounted on power screw 106 so that power screw 106 is rotatable relative to first ratchet gear 124. First ratchet gear 124 comprises first-ratchet-gear first surface 182, facing flange first surface 136, and first-ratchet-gear second surface 184, opposite first-ratchet-gear first surface 182 and facing housing 140. Anti-back-drive mechanism 114 further comprises first ratchet pawl 126 that prevents first ratchet gear 124 from rotating in the first rotational direction when first ratchet pawl 126 engages first ratchet gear 124. Anti-back-drive mechanism 114 also comprises first friction device 128, located between flange first surface 136 and first-ratchet-gear first surface 182. Anti-back-drive mechanism 114 additionally comprises first thrust bearing 178, located between first-ratchet-gear second surface 184 and housing 140. First friction device 128 is configured to form a frictional coupling between flange 122 and first ratchet gear 124 when the first force is applied to nut 108 in the first axial direction along power screw 106. The frictional coupling between flange 122 and first ratchet gear 124 opposes relative rotational motion between flange 122 and first ratchet gear 124. The internal loading of anti-back-drive mechanism 114, measured by sensor 120 when the first force is applied to nut 108 in the first axial direction along power screw 106, is a first load, applied to first ratchet pawl 126 by first ratchet gear 124.

Measurement of the first load, applied to first ratchet pawl 126 by first ratchet gear 124, is generally indicative of proper operation of anti-back-drive mechanism 114 and, more particularly, is indicative of sufficient frictional resistance between flange 122 and first ratchet gear 124 via first friction device 128 and proper one-way locking engagement between first ratchet pawl 126 and first ratchet gear 124.

In one or more examples, anti-back-drive mechanism 114 operates under compression loads, applied to trim actuator 102 by horizontal stabilizer 210, such as when the first force is applied to nut 108 in the first axial direction along power screw 106, via: (1) frictionally coupling first ratchet gear 124 with flange 122 via first friction device 128 to oppose relative rotational motion between flange 122 and first ratchet gear 124; and (2) engaging first ratchet gear 124 with first ratchet pawl 126 to prevent first ratchet gear 124 from rotating in the first rotational direction. Under tension loads, applied to trim actuator 102 by horizontal stabilizer 210, such as when the second force is applied to nut 108 in the second axial direction along power screw 106, flange 122 is frictionally uncoupled from first ratchet gear 124 so that flange 122 is free to rotate relative to first ratchet gear 124.

In one or more examples, first ratchet gear 124 is mounted to rotate about a common axis with power screw 106. First ratchet pawl 126 is mounted to housing 140, surrounding anti-back-drive mechanism 114 and a portion of power screw 106. First ratchet gear 124 includes on its radial periphery a circumferentially spaced array of first ratchet teeth configured to mate with an end of first ratchet pawl 126. First ratchet gear 124 and first ratchet pawl 126 are configured such that first ratchet gear 124 rotates freely in the second rotational direction, with first ratchet pawl 126 ratcheting across but not engaging the series of first ratchet teeth on first ratchet gear 124. First ratchet gear 124 and first ratchet pawl 126 are further configured such that first ratchet pawl 126 will engage the first ratchet teeth and prevent rotation of first ratchet gear 124 in the first rotational direction.

First friction device 128 is a friction-producing surface or device, such as a friction disk or skewed-axis roller bearing, sandwiched between flange first surface 136 of flange 122 and first-ratchet-gear first surface 182 of first ratchet gear 124. A compressive load, applied to trim actuator 102 by horizontal stabilizer 210 (e.g., when the first force is applied to nut 108 in the first axial direction along power screw 106) presses flange 122 into contact with first friction device 128 and presses first friction device 128 into contact with first ratchet gear 124 such that flange 122 is frictionally coupled with first ratchet gear 124 via first friction device 128.

First thrust bearing 178 is positioned between first ratchet gear 124 and housing 140 and is configured to enable rotation of first ratchet gear 124 relative to housing 140 under an axial load.

When power screw 106 and flange 122 are rotated in the second rotational direction by rotary actuator 104, first ratchet gear 124 will rotate freely with power screw 106 and flange 122. Should power screw 106 and flange 122 try to rotate in the first rotational direction, first ratchet gear 124 and first ratchet pawl 126 will lock-up and prevent first ratchet gear 124 from rotating. Relative motion between flange 122 and first ratchet gear 124 is resisted by first friction device 128, thereby preventing rotation of power screw 106 in the first rotational direction.

With anti-back-drive mechanism 114 engaged (e.g., with flange 122 frictionally coupled with first ratchet gear 124), rotation of power screw 106 in first rotational direction is achieved using rotary actuator 104. Power from rotary actuator 104 is sufficient to overcome the frictional coupling between flange 122 and first ratchet gear 124 such that flange 122 rotates relative to first ratchet gear 124, thereby enabling actuator-driven rotation of power screw 106 in the first direction.

In one or more examples, anti-back-drive mechanism 114 include redundancies. In one or more examples, anti-back-drive mechanism 114 includes more than one first ratchet pawl 126.

In one or more examples, the primary mechanisms for the irreversibility function in the first rotational direction of anti-back-drive mechanism 114 are the frictional coupling between flange 122 and first ratchet gear 124 and the mechanical engagement between first ratchet pawl 126 and first ratchet gear 124. These components form a portion of the primary load path from horizontal stabilizer 210, through trim actuator 102, and to support structure 218 (FIG. 3) of aircraft 200. The integrity and structural health of these components provide for proper operation of anti-back-drive mechanism 114.

Thus, measuring the first load, applied to first ratchet pawl 126 by first ratchet gear 124, provides an indication of the integrity and/or structural and functional health of first ratchet pawl 126, first ratchet gear 124, and first friction device 128. In one or more examples, improper operation of anti-back-drive mechanism 114 is detected when a value representative of a magnitude of the first load, applied to first ratchet pawl 126 by first ratchet gear 124, measured by sensor 120, is below the minimum predetermined load-magnitude threshold. In one or more examples, the service life of anti-back-drive mechanism 114 is determined based on a statistical analysis of anti-back-drive mechanism 114 when a value representative of the magnitude of the first load, applied to first ratchet pawl 126 by first ratchet gear 124, measured by sensor 120, is above the maximum predetermined load-magnitude threshold.

Referring generally to FIG. 1 and particularly to, e.g., FIGS. 2-5 for illustrative purposes only and not by way of limitation, the following portion of this paragraph delineates example 6 of the subject matter, disclosed herein. According to example 6, which encompasses example 5, above, anti-back-drive mechanism 114 further comprises second ratchet gear 142, concentrically mounted on power screw 106 so that power screw 106 is rotatable relative to second ratchet gear 142. Second ratchet gear 142 comprises second-ratchet-gear first surface 186, facing flange second surface 138, and second-ratchet-gear second surface 188, opposite second-ratchet-gear first surface 186 and facing housing 140. Anti-back-drive mechanism 114 also comprises second ratchet pawl 144 that prevents second ratchet gear 142 from rotating in the second rotational direction when second ratchet pawl 144 engages second ratchet gear 142. Anti-back-drive mechanism 114 additionally comprises second friction device 146, located between flange second surface 138 and second-ratchet-gear first surface 186. Anti-back-drive mechanism 114 further comprises second thrust bearing 180, located between second-ratchet-gear second surface 188 and housing 140. Second friction device 146 is configured to form a frictional coupling between flange 122 and second ratchet gear 142 when the second force is applied to nut 108 in the second axial direction along power screw 106. The frictional coupling between flange 122 and second ratchet gear 142 opposes relative rotational motion between flange 122 and second ratchet gear 142. The internal loading of anti-back-drive mechanism 114, measured by sensor 120 when the second force is applied to nut 108 in the second axial direction along power screw 106, is a second load, applied to second ratchet pawl 144 by second ratchet gear 142.

Measurement of the second load, applied to second ratchet pawl 144 by second ratchet gear 142, is generally indicative of proper operation of anti-back-drive mechanism 114 and, more particularly, is indicative of sufficient frictional resistance between flange 122 and second ratchet gear 142 and proper one-way locking engagement between second ratchet pawl 144 and second ratchet gear 142.

In one or more examples, anti-back-drive mechanism 114 operates under tension loads, applied to trim actuator 102 by horizontal stabilizer 210, such as when the second force is applied to nut 108 in the second axial direction along power screw 106, via: (1) frictionally coupling second ratchet gear 142 with flange 122 via second friction device 146 to oppose relative rotational motion between flange 122 and second ratchet gear 142; and (2) engaging second ratchet gear 142 with second ratchet pawl 144 to prevent second ratchet gear 142 from rotating in the second rotational direction. Under compression loads, applied to trim actuator 102 by horizontal stabilizer 210, such as when the first force is applied to nut 108 in the first axial direction along power screw 106, flange 122 is frictionally uncoupled from second ratchet gear 142 so that flange 122 is free to rotate relative to second ratchet gear 142.

In one or more examples, second ratchet gear 142 is mounted to rotate about a common axis with power screw 106. Second ratchet pawl 144 is mounted to housing 140, surrounding anti-back-drive mechanism 114 and a portion of power screw 106. Second ratchet gear 142 includes, on its radial periphery, a circumferentially spaced array of second ratchet teeth configured to mate with an end of second ratchet pawl 144. Second ratchet gear 142 and second ratchet pawl 144 are configured such that second ratchet gear 142 rotates freely in the first rotational direction, with second ratchet pawl 144 ratcheting across but not engaging the series of second ratchet teeth on second ratchet gear 142. Second ratchet gear 142 and second ratchet pawl 144 are further configured such that second ratchet pawl 144 will engage the second ratchet teeth and prevent rotation of second ratchet gear 142 in the second rotational direction.

Second friction device 146 is a friction-producing surface or device, such as a friction disk or skewed-axis roller bearing, sandwiched between flange second surface 138 of flange 122 and second-ratchet-gear first surface 186 of second ratchet gear 142. A tension load, applied to trim actuator 102 by horizontal stabilizer 210 (e.g., when the second force is applied to nut 108 in the second axial direction along power screw 106), presses flange 122 into contact with second friction device 146 and presses second friction device 146 into contact with second ratchet gear 142 such that flange 122 is frictionally coupled with second ratchet gear 142 via second friction device 146.

Second thrust bearing 180 is positioned between second ratchet gear 142 and housing 140 and is configured to enable rotation of second ratchet gear 142 relative to housing 140 under an axial load.

When power screw 106 and flange 122 are rotated in the first rotational direction by rotary actuator 104, second ratchet gear 142 will rotate freely with power screw 106 and flange 122. Should power screw 106 and flange 122 try to rotate in the second rotational direction, second ratchet gear 142 and second ratchet pawl 144 will lock-up and prevent second ratchet gear 142 from rotating. Relative motion between flange 122 and second ratchet gear 142 is resisted by second friction device 146, thereby preventing rotation of power screw 106 in the second rotational direction.

With anti-back-drive mechanism 114 engaged (e.g., with flange 122 frictionally coupled with second ratchet gear 142), rotation of power screw 106 in second rotational direction is achieved using rotary actuator 104. Power from rotary actuator 104 is sufficient to overcome the frictional coupling between flange 122 and second ratchet gear 142 such that flange 122 rotates relative to second ratchet gear 142, thereby enabling actuator-driven rotation of power screw 106 in the second direction.

In one or more examples, anti-back-drive mechanism 114 includes redundancies. In one or more examples, anti-back-drive mechanism 114 includes more than one second ratchet pawl 144.

In one or more examples, the primary mechanisms for the irreversibility function in the second rotational direction of anti-back-drive mechanism 114 are the frictional coupling between flange 122 and second ratchet gear 142 and the mechanical engagement between second ratchet pawl 144 and second ratchet gear 142. These components form a portion of the primary load path from horizontal stabilizer 210, through trim actuator 102, and to support structure 218 (FIG. 3) of aircraft 200. The integrity and structural health of these components provide for proper operation of anti-back-drive mechanism 114.

Thus, measuring the second load, applied to second ratchet pawl 144 by second ratchet gear 142, provides an indication of the integrity and/or structural and functional health of second ratchet pawl 144, second ratchet gear 142, and second friction device 146. In one or more examples, improper operation of anti-back-drive mechanism 114 is detected when a value, representative of a magnitude of the second load, applied to second ratchet pawl 144 by second ratchet gear 142, measured by sensor 120, is below the minimum predetermined load-magnitude threshold. In one or more examples, the service life of anti-back-drive mechanism 114 is determined based on a statistical analysis of anti-back-drive mechanism 114 when a value, representative of the magnitude of the second load, applied to second ratchet pawl 144 by second ratchet gear 142, measured by sensor 120, is above the maximum predetermined load-magnitude threshold.

Referring generally to FIG. 1 and particularly to, e.g., FIGS. 4 and 5 for illustrative purposes only and not by way of limitation, the following portion of this paragraph delineates example 7 of the subject matter, disclosed herein. According to example 7, which encompasses example 6, above, trim actuator 102 further comprises first pin 148 that couples first ratchet pawl 126 to housing 140, and second pin 150 that couples second ratchet pawl 144 to housing 140. Sensor 120 comprises first shear sensor 152, configured to measure a first shear load, applied to first pin 148 by first ratchet pawl 126 when the first force is applied to nut 108 in the first axial direction along power screw 106. Sensor 120 further comprises second shear sensor 154, configured to measure a second shear load, applied to second pin 150 by second ratchet pawl 144 when the second force is applied to nut 108 in the second axial direction along power screw 106.

First shear sensor 152 enables the internal loading of anti-back-drive mechanism 114, measured by sensor 120 when the first force is applied to nut 108 in the first axial direction along power screw 106, to be a first shear load, applied to first pin 148 by first ratchet pawl 126. Second shear sensor 154 enables the internal loading of anti-back-drive mechanism 114, measured by sensor 120 when the second force is applied to nut 108 in the second axial direction along power screw 106, to be a second shear load, applied to second pin 150 by second ratchet pawl 144.

In one or more examples, first ratchet pawl 126 is coupled to and is pivotable relative to housing 140 by first pin 148. In one or more examples, a first torsion spring provides a rotational force to keep first ratchet pawl 126 in contact with the first ratchet teeth of first ratchet gear 124. The first load, applied to first ratchet pawl 126 by first ratchet gear 124 is reacted by first pin 148 and is transferred to housing 140 through first pin 148. Thus, first pin 148 experiences the first shear load, applied by first ratchet pawl 126.

In one or more examples, second ratchet pawl 144 is coupled to and is pivotable relative to housing 140 by second pin 150. In one or more examples, a second torsion spring provides a rotational force to keep second ratchet pawl 144 in contact with the second ratchet teeth of second ratchet gear 142. The second load, applied to second ratchet pawl 144 by second ratchet gear 142, is reacted by second pin 150 and is transferred to housing 140 through second pin 150. Thus, second pin 150 experiences the second shear load, applied by second ratchet pawl 144.

In one or more examples, first shear sensor 152 is any suitable device or plurality of devices that is configured to measure the first shear load, applied to first pin 148 by first ratchet pawl 126. In one or more examples, second shear sensor 154 is any suitable device or plurality of devices that is configured to measure the second shear load, applied to second pin 150 by second ratchet pawl 144.

In one or more examples, first shear sensor 152 and second shear sensor 154 are contact sensors, such as transducers, piezoelectric shear force sensors, thermal shear stress sensors, and the like. In one or more examples, first shear sensor 152 and second shear sensor 154 non-contact sensors, such as magnetic sensors (e.g., magnetostrictive sensors).

Referring generally to FIG. 1 and particularly to, e.g., FIG. 6 for illustrative purposes only and not by way of limitation, the following portion of this paragraph delineates example 8 of the subject matter, disclosed herein. According to example 8, which encompasses example 6, above, sensor 120 comprises first torque sensor 156, configured to measure a first torque, applied to first ratchet pawl 126 by first ratchet gear 124 when the first force is applied to nut 108 in the first axial direction along power screw 106. Sensor 120 further comprises second torque sensor 158, configured to measure a second torque, applied to second ratchet pawl 144 by second ratchet gear 142 when the second force is applied to nut 108 in the second axial direction along power screw 106.

First torque sensor 156 enables the internal loading of anti-back-drive mechanism 114, measured by sensor 120 when the first force is applied to nut 108 in the first axial direction along power screw 106, to be the first torque, applied directly to first ratchet pawl 126 by first ratchet gear 124. Second torque sensor 158 enables the internal loading of anti-back-drive mechanism 114, measured by sensor 120 when the second force is applied to nut 108 in the second axial direction along power screw 106, to be the second torque, applied directly to second ratchet pawl 144 by second ratchet gear 142.

In one or more examples, first ratchet pawl 126 experiences the first torque, applied by first ratchet gear 124. Second ratchet pawl 144 experiences the second torque, applied by second ratchet gear 142.

In one or more examples, first torque sensor 156 is any suitable device or plurality of devices that is configured to measure the first torque, applied to first ratchet pawl 126 by first ratchet gear 124. In one or more examples, second torque sensor 158 is any suitable device or plurality of devices that is configured to measure the second torque, applied to second ratchet pawl 144 by second ratchet gear 142.

In one or more examples, first torque sensor 156 and second torque sensor 158 are contact or reaction sensors, such as transducers, strain gauges, and the like. In one or more examples, first torque sensor 156 and second torque sensor 158 non-contact sensors, such as magnetic or inductive sensors.

Referring generally to FIG. 1 and particularly to, e.g., FIGS. 2-8 for illustrative purposes only and not by way of limitation, the following portion of this paragraph delineates example 9 of the subject matter, disclosed herein. According to example 9, which encompasses any one of examples 5 to 8, above, trim actuator 102 further comprises lock 118, configured to selectively prevent rotation of power screw 106 in the first rotational direction and in the second rotational direction.

Lock 118 facilitates selective prevention of rotation of power screw 106 via mechanical engagement with power screw 106.

Lock 118 is configured stop and hold power screw 106 and, thus, fix the inclination of horizontal stabilizer 210. In one or more examples, lock 118 uses mechanical engagement with power screw 106 to prevent rotation of power screw 106 in the first rotational direction and the second rotational direction.

Figure 7:
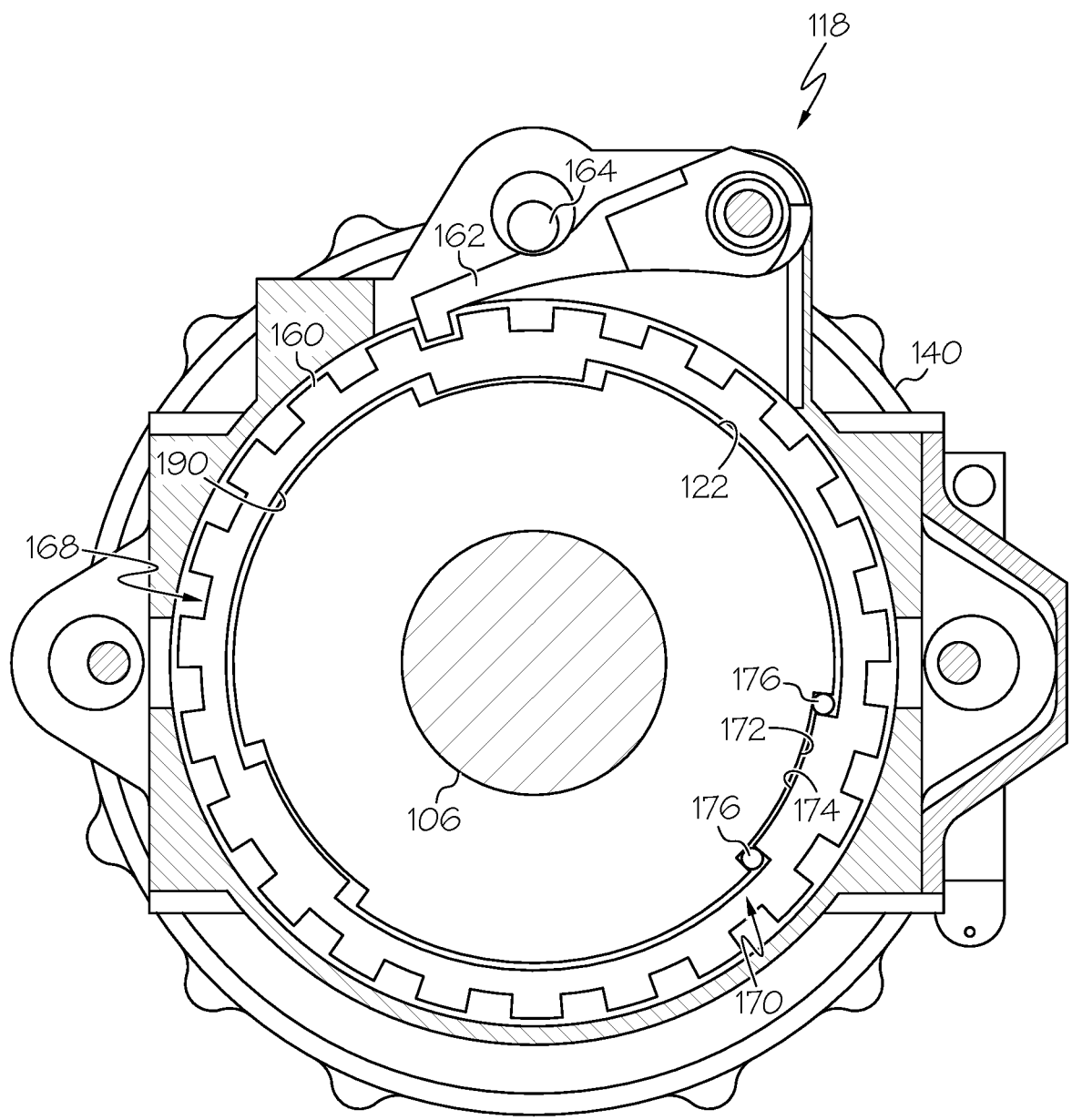
FIG. 7 is a schematic, elevation view of a lock of the trim actuator of FIG. 1, according to one or more examples of the subject matter, disclosed herein.
Figure 8:
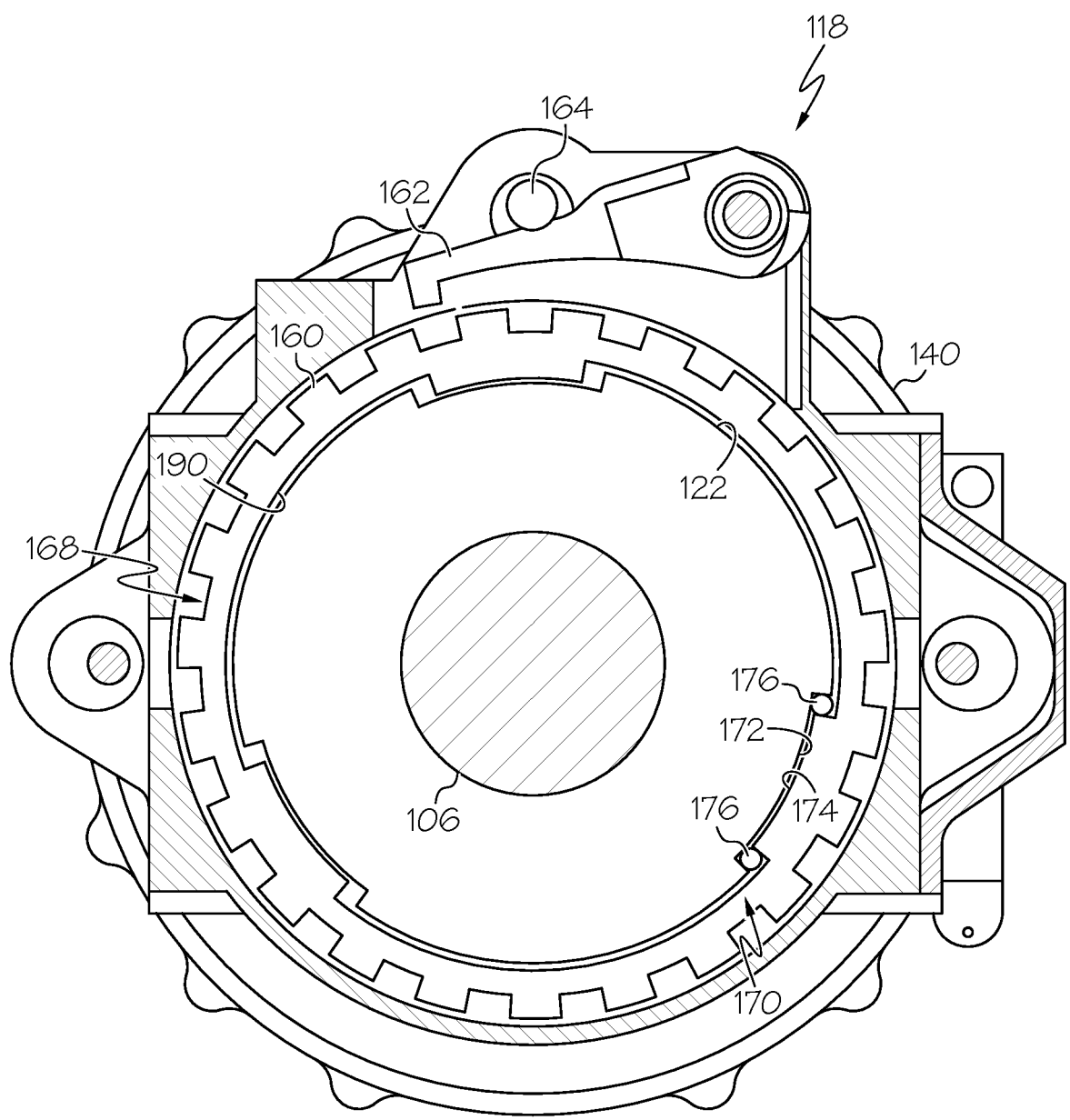
FIG. 8 is a schematic, elevation view of the lock of the trim actuator of FIG. 1, according to one or more examples of the subject matter, disclosed herein.

In one or more examples, lock 118 is configured such that in an unactuated, or disengaged, state (e.g., as shown in FIG. 8) flange 122 rotates freely in the first rotational direction and the second rotational direction. Lock 118 is also configured such that in an actuated, or engaged, state (e.g., as shown in FIG. 7) lock 118 will engage power screw 106 and prevent rotation of power screw 106 in the first rotational direction and the second rotational direction.

In one or more examples, actuation of lock 118 is provided through any suitable means, such as through electrical, mechanical, pneumatic, or hydraulic methods. In one or more examples, actuation of lock 118 is commanded, for example, under control from control unit 196 (FIG. 1). In one or more examples, lock 118 is provided as a fail-safe mechanism, such as in the event of improper operation of anti-back-drive mechanism 114 and brake 116. In one or more examples, lock 118 automatically engages power screw 106 when the internal loading of anti-back-drive mechanism 114, measured by sensor 120, indicates improper operation of anti-back-drive mechanism 114, such as when the internal loading of anti-back-drive mechanism 114 is below the minimum predetermined load-magnitude threshold.

Referring generally to FIG. 1 and particularly to, e.g., FIGS. 2-8 for illustrative purposes only and not by way of limitation, the following portion of this paragraph delineates example 10 of the subject matter, disclosed herein. According to example 10, which encompasses example 9, above, lock 118 is configured to selectively engage flange 122 of power screw 106.

Engagement of lock 118 with flange 122 facilitates mechanical coupling with power screw 106 via an existing structural component of power screw 106.

In one or more examples, lock 118 is configured such that in an unactuated, or disengaged, state (e.g., as shown in FIG. 8) flange 122 rotates freely in the first rotational direction and in the second rotational direction. Lock 118 is also configured such that in an actuated, or engaged, state (e.g., as shown in FIG. 7) lock 118 will engage flange 122 and prevent rotation of flange 122 and, thus, power screw 106, in the first rotational direction and in the second rotational direction.

In one or more examples of trim actuator 102, flange 122 is an integral and existing structural component of power screw 106 that is utilized by anti-back-drive mechanism 114 to provide the irreversibility function of trim actuator 102. Engagement with flange 122 enables at least a portion of lock 118 to be contained within housing 140 and operate in the same space as anti-back-drive mechanism 114. In one or more examples, this configuration advantageously optimizes the size of trim actuator 102, which is a constraint on many aircraft.

Referring generally to FIG. 1 and particularly to, e.g., FIGS. 5, 7, and 8 for illustrative purposes only and not by way of limitation, the following portion of this paragraph delineates example 11 of the subject matter, disclosed herein. According to example 11, which encompasses example 10, above, lock 118 comprises plurality of locking teeth 160, located circumferentially on flange 122. Lock 118 also comprises locking lever 162, configured to prevent power screw 106 from rotating in the first rotational direction and in the second rotational direction when locking lever 162 engages plurality of locking teeth 160.

Use of plurality of locking teeth 160 and selective engagement of locking lever 162 with plurality of locking teeth 160 enables mechanical engagement between lock 118 and flange 122 at a plurality of rotational positions of power screw 106 to prevent further rotation of power screw 106 and, thus, fix the orientation of horizontal stabilizer 210.

In one or more examples, locking lever 162 is mounted to housing 140. For example, locking lever 162 is coupled to and is pivotable relative to housing 140 by a pin. In one or more examples, flange 122 includes plurality of locking teeth 160 on its radial periphery as a circumferentially spaced array. An end of locking lever 162 is configured to mate with plurality of locking teeth 160. Locking lever 162 and plurality of locking teeth 160 are configured such that in an unactuated, or disengaged, state (e.g., as shown in FIG. 8) flange 122 rotates freely in the first rotational direction and in the second rotational direction. Locking lever 162 and plurality of locking teeth 160 are also configured such that in an actuated, or engaged, state (e.g., as shown in FIG. 7) locking lever 162 will engage plurality of locking teeth 160 and prevent rotation of flange 122 and, thus, power screw 106, in the first rotational direction and in the second rotational direction.

Referring generally to FIG. 1 and particularly to, e.g., FIGS. 5, 7, and 8 for illustrative purposes only and not by way of limitation, the following portion of this paragraph delineates example 12 of the subject matter, disclosed herein. According to example 12, which encompasses example 11, above, lock 118 further comprises cam 164, configured to move locking lever 162 into engagement with plurality of locking teeth 160. Lock 118 additionally comprises cam actuator 166, configured to drive cam 164.

Cam 164 and cam actuator 166 facilitate simple and reliable selective engagement of locking lever 162 with plurality of locking teeth 160 to prevent rotation of power screw 106.

Cam actuator 166 provides power for commanded motion of cam 164 and, thus, locking lever 162. In one or more examples, cam actuator 166 is any suitable type of drive motor, such as a hydraulic motor, an electric motor, or a pneumatic motor. In one or more examples, cam actuator 166 is a rotary motor or a linear actuator.

In one or more examples, cam 164 is any suitable rotating or sliding device used to transfer motion from cam actuator 166 into pivotal motion of locking lever 162 for selectively engaging plurality of locking teeth 160 to prevent rotation of power screw 106 (e.g., as shown in FIG. 7) and selectively disengaging plurality of locking teeth 160 to permit rotation of power screw 106 (e.g., as shown in FIG. 8).

Referring generally to FIG. 1 and particularly to, e.g., FIGS. 5, 7, and 8 for illustrative purposes only and not by way of limitation, the following portion of this paragraph delineates example 13 of the subject matter, disclosed herein. According to example 13, which encompasses example 12, above, locking lever 162 is biased out of engagement from plurality of locking teeth 160 when power screw 106 is rotated in the first rotational direction and in the second rotational direction by rotary actuator 104.

Biasing locking lever 162 out of engagement with plurality of locking teeth 160 enables actuator-driven rotation of power screw 106 until selective engagement of locking lever 162 with plurality of locking teeth 160 to prevent rotation of power screw 106.

In one or more examples, a torsion spring provides a rotational force to bias locking lever 162 out of contact with plurality of locking teeth 160. Actuation of lock 118, such as actuation of cam actuator 166 and actuator driven motion of cam 164, commands locking lever 162 move into engagement with plurality of locking teeth 160 (e.g., as shown in FIG. 7).

Referring generally to FIG. 1 and particularly to, e.g., FIGS. 7 and 8 for illustrative purposes only and not by way of limitation, the following portion of this paragraph delineates example 14 of the subject matter, disclosed herein. According to example 14, which encompasses any one of examples 11 to 13, above, lock 118 further comprises annular locking gear 168, mounted concentrically on flange 122 so that annular locking gear 168 rotates with flange 122. Annular locking gear 168 comprises plurality of locking teeth 160.

Annular locking gear 168 facilitates utilization of flange 122, which is an existing structural component of power screw 106 and anti-back-drive mechanism 114, as a component of lock 118.

In one or more examples, annular locking gear 168 is coupled to a radial periphery of flange 122. In one or more examples, annular locking gear 168 is coupled to flange 122 by any suitable method. Annular locking gear 168 includes plurality of locking teeth 160 on its radial periphery as a circumferentially spaced array. Plurality of locking teeth 160 is configured to mate with the end of locking lever 162.

Referring generally to FIG. 1 and particularly to, e.g., FIGS. 7 and 8 for illustrative purposes only and not by way of limitation, the following portion of this paragraph delineates example 15 of the subject matter, disclosed herein. According to example 15, which encompasses example 14, above, lock 118 further comprises lost-motion mechanism 170, configured to enable flange 122 to rotate through a predetermined angle relative to annular locking gear 168 after locking lever 162 engages plurality of locking teeth 160.

Lost-motion mechanism 170 provides clearance for engagement of locking lever 162 with plurality of locking teeth 160 while flange 122 is rotating.

In one or more examples, when it is desired for rotation of power screw 106 to be stopped and held, locking lever 162 is moved into engagement with plurality of locking teeth 160, for example, under command from the pilot or automatically upon detection of improper operation of anti-back-drive mechanism 114. Engagement of locking lever 162 with plurality of locking teeth 160 immediately stops rotational motion of annular locking gear 168. However, lost-motion mechanism 170 enables flange 122 and, thus, power screw 106 a degree of rotational motion relative to annular locking gear 168.

The type of relative movement described above is referred to as lost motion, given that flange 122 has a degree of motion that does not translate to annular locking gear 168. Generally, lost motion refers to the angle of movement of flange 122 and, thus, power screw 106, after movement of annular locking gear 168 is prevented without applying appreciable force or motion to annular locking gear 168. This angle of movement is also be known as backlash, slop, or free-play. Although, in one or more examples, the lost motion is shown and described relative to flange 122 and annular locking gear 168, in other examples, different mechanisms can be implemented in lock 118 to provide for lost motion similar to what described above.

Referring generally to FIG. 1 and particularly to, e.g., FIGS. 7 and 8 for illustrative purposes only and not by way of limitation, the following portion of this paragraph delineates example 16 of the subject matter, disclosed herein. According to example 16, which encompasses example 15, above, annular locking gear 168 comprises inner surface 190, opposite plurality of locking teeth 160. Lost-motion mechanism 170 comprises slot 172, formed on a circumference of flange 122. Lost-motion mechanism 170 further comprises key 174, projecting from inner surface 190 of annular locking gear 168 and received in slot 172. Slot 172 and key 174 are sized so that rotational play exists between annular locking gear 168 and flange 122.

Rotational play (e.g., backlash) between annular locking gear 168 and flange 122 spreads out the impulse between annular locking gear 168 and flange 122 and provides clearance for rotational movement of flange 122 and, thus, power screw 106 when locking lever 162 engages plurality of locking teeth 160 to stop rotation of power screw 106.

In one or more examples, slot 172 and key 174 have any suitable geometry and/or size. Generally, slot 172 and key 174 have complementary geometries such that key 174 mates with and fits within slot 172. Slot 172 is sized larger that key 174 such that clearance (e.g., a gap) is formed between opposing sides of key 174 and respective opposing sides of slot 172. This clearance provides the rotational play between annular locking gear 168 and flange 122.

While the illustrative examples depict slot 172 formed on the circumference of flange 122 and key 174 projecting from inner surface 190 of annular locking gear 168, not all examples need to have a similar construction. In one or more examples, key 174 projects from the circumference of flange 122 and slot 172 is formed on inner surface 190 of annular locking gear 168. Additionally, in one or more examples, lost-motion mechanism 170 includes more that one slot 172 and more than one key 174.

Referring generally to FIG. 1 and particularly to, e.g., FIGS. 7 and 8 for illustrative purposes only and not by way of limitation, the following portion of this paragraph delineates example 17 of the subject matter, disclosed herein. According to example 17, which encompasses example 16, above, lost-motion mechanism 170 further comprises damper 176, located in slot 172 and configured to reduce shock loading of slot 172 and key 174, associated with the rotational play between annular locking gear 168 and flange 122.

Damper 176 provides a reactive damping force that absorbs shock between key 174 and slot 172 when locking lever 162 engages plurality of locking teeth 160. Damper 176 also provides a centering function for key 174 within slot 172.

In one or more examples, damper 176 includes, or takes the form of, any suitable resilient device or plurality of resilient devices that is configured to absorb motion and counter the effects of inertia. In one or more examples, damper 176 includes a resilient member, located in the gaps, formed between the sides of key 174 and the sides of slot 172.

Referring generally to FIG. 9 and particularly to, e.g., FIGS. 1-5 for illustrative purposes only and not by way of limitation, the following portion of this paragraph delineates example 18 of the subject matter, disclosed herein. According to example 18, method 1000 of using trim actuator 102 according to example 6, above, to control horizontal stabilizer 210 of aircraft 200 comprises a step of (block 1002) frictionally coupling power screw 106 with anti-back-drive mechanism 114 to prevent rotation of power screw 106 in the first rotational direction when the first force is applied to nut 108 in the first axial direction along power screw 106. Method 1000 also comprises a step of (block 1004) frictionally coupling power screw 106 with anti-back-drive mechanism 114 to prevent rotation of power screw 106 in the second rotational direction, opposite the first rotational direction, when the second force is applied to nut 108 in the second axial direction, opposite the first axial direction. Method 1000 further comprises a step of (block 1006) measuring the internal loading of anti-back-drive mechanism 114 when the first force is applied to nut 108 in the first axial direction along power screw 106 and when the second force is applied to nut 108 in the second axial direction, opposite the first axial direction, using sensor 120.

Frictionally coupling power screw 106 with anti-back-drive mechanism 114 facilitates the irreversibility function of trim actuator 102, while enabling actuator-driven rotational motion of power screw 106. Measuring the internal loading of anti-back-drive mechanism 114 by sensor 120 provides a means for monitoring the structural health of anti-back-drive mechanism 114.

As described above, during normal flight conditions, the inclination of horizontal stabilizer 210 is controllably adjusted using trim actuator 102. Anti-back-drive mechanism 114 operates to under compression loads imposed on trim actuator 102 by horizontal stabilizer 210 to oppose (e.g., prevent) back-driven rotation of power screw 106 in the first rotational direction. Anti-back-drive mechanism 114 operates to under tension loads imposed on trim actuator 102 by horizontal stabilizer 210 to oppose (e.g., prevent) back-driven rotation of power screw 106 in the second rotational direction.

In one or more examples, with trim actuator 102 operating under a compression load, the step of (block 1006) measuring the internal loading of anti-back-drive mechanism 114 when the first force is applied to nut 108 in the first axial direction along power screw 106, provides an indication of the integrity and/or structural and functional health of anti-back-drive mechanism 114 to the pilot, automatic flight-control system, and/or flight log via detecting (or non-detecting) the internal loading of anti-back-drive mechanism and transmitting a corresponding signal to control unit 196. For example, with trim actuator 102 operating under a compression load, the step of (block 1006) measuring the internal loading of anti-back-drive mechanism 114 when the first force is applied to nut 108 in the first axial direction along power screw 106, provides an indication of the integrity and/or structural and functional health of first ratchet pawl 126, first ratchet gear 124, and first friction device 128.

In one or more examples, with trim actuator 102 operating under a tension load, the step of (block 1006) measuring the internal loading of anti-back-drive mechanism 114 when the second force is applied to nut 108 in the second axial direction along power screw 106 provides an indication of the integrity and/or structural and functional health of anti-back-drive mechanism 114 to the pilot, automatic flight-control system, and/or flight log via detecting (or non-detecting) the internal loading of anti-back-drive mechanism and transmitting a corresponding signal to control unit 196. For example, with trim actuator 102 operating under a tension load, the step of (block 1006) measuring the internal loading of anti-back-drive mechanism 114, when the second force is applied to nut 108 in the second axial direction along power screw 106, provides an indication of the integrity and/or structural and functional health of second ratchet pawl 144, second ratchet gear 142, and second friction device 146.

Referring generally to FIG. 9 and particularly to, e.g., FIG. 1 for illustrative purposes only and not by way of limitation, the following portion of this paragraph delineates example 19 of the subject matter, disclosed herein. According to example 19, which encompasses example 18, above, method 1000 further comprises a step of (block 1008) comparing a measured value of the internal loading of anti-back-drive mechanism 114 to a minimum predetermined load-magnitude threshold.

Detecting when the internal loading of anti-back-drive mechanism 114 is below the minimum load-magnitude threshold provides a real-time indication that the irreversibility function provided by anti-back-drive mechanism 114 is operating improperly.

In one or more examples, a measured value representative of the magnitude of the internal loading of anti-back-drive mechanism 114 being below the minimum predetermined load-magnitude threshold provides a real-time indication of improper operation of anti-back-drive mechanism 114, for example, that anti-back-drive mechanism 114 is no longer properly opposing the back-driven rotation of power screw 106 and, thus, is no longer preventing rotation of power screw 106 or holding the inclination of horizontal stabilizer 210. In one or more examples, the measured value, representative of the magnitude of the internal loading of anti-back-drive mechanism 114 being above the minimum predetermined load-magnitude threshold, provides a real-time indication of proper operation of anti-back-drive mechanism 114, for example, that anti-back-drive mechanism 114 is properly opposing the back-driven rotation of power screw 106 and, thus, is preventing rotation of power screw 106 and holding the inclination of horizontal stabilizer 210.

Referring generally to FIG. 9 and particularly to, e.g., FIG. 1 for illustrative purposes only and not by way of limitation, the following portion of this paragraph delineates example 20 of the subject matter, disclosed herein. According to example 20, which encompasses example 18 or 19, above, method 1000 further comprises a step of (block 1010) comparing a measured value of the internal loading of anti-back-drive mechanism 114 to a maximum predetermined load-magnitude threshold.

Detecting when the internal loading is above the maximum predetermined load-magnitude threshold provides a basis for analysis of the service life of anti-back-drive mechanism 114.

In one or more examples, a measured value representative of the magnitude of the internal loading of anti-back-drive mechanism 114 being above the maximum predetermined load-magnitude threshold provides an indication that anti-back-drive mechanism 114 has experienced a load or shock above that for which anti-back-drive mechanism 114 was designed. A measured value, representative of the magnitude of the internal loading of anti-back-drive mechanism 114 being below the maximum predetermined load-magnitude threshold, provides an indication that anti-back-drive mechanism 114 is experiencing normal operating loads.

Referring generally to FIG. 9 and particularly to, e.g., FIGS. 1-5 for illustrative purposes only and not by way of limitation, the following portion of this paragraph delineates example 21 of the subject matter, disclosed herein. According to example 21, which encompasses any one of examples 18 or 20, above, the step of (block 1002) frictionally coupling power screw 106 with anti-back-drive mechanism 114 to prevent rotation of power screw 106 in the first rotational direction when the first force is applied to nut 108 in the first axial direction along power screw 106 comprises a step of (block 1012) engaging first ratchet pawl 126 with first ratchet gear 124 to prevent first ratchet gear 124 from rotating in the first rotational direction and a step of frictionally coupling first ratchet gear 124 with flange 122 via first friction device 128 to oppose relative rotational motion between flange 122 and first ratchet gear 124. The step of (block 1006) measuring the internal loading of anti-back-drive mechanism 114 when the first force is applied to nut 108 in the first axial direction along power screw 106 comprises a step of (block 1014) measuring a first load, applied to first ratchet pawl 126 by first ratchet gear 124.

Measuring the first load, applied to first ratchet pawl 126 by first ratchet gear 124, generally indicates proper operation of anti-back-drive mechanism 114 and, more particularly, indicates sufficient frictional resistance between flange 122 and first ratchet gear 124 via first friction device 128 and proper one-way locking engagement between first ratchet pawl 126 and first ratchet gear 124.

Referring generally to FIG. 9 and particularly to, e.g., FIGS. 1-5 for illustrative purposes only and not by way of limitation, the following portion of this paragraph delineates example 22 of the subject matter, disclosed herein. According to example 22, which encompasses example 21, above, the step of (block 1004) frictionally coupling power screw 106 with anti-back-drive mechanism 114 to prevent rotation of power screw 106 in the second rotational direction, which is opposite the first rotational direction, when the second force is applied to nut 108 in the second axial direction, opposite the first axial direction, comprises a step of (block 1016) engaging second ratchet pawl 144 with second ratchet gear 142 to prevent second ratchet gear 142 from rotating in the second rotational direction and a step of frictionally coupling second ratchet gear 142 with flange 122 via second friction device 146 to oppose relative rotational motion between flange 122 and second ratchet gear 142. The step of (block 1006) measuring the internal loading of anti-back-drive mechanism 114 when the second force is applied to nut 108 in the second axial direction along power screw 106 comprises a step of (block 1018) measuring a second load, applied to second ratchet pawl 144 by second ratchet gear 142.

Measuring the second load, applied to second ratchet pawl 144 by second ratchet gear 142, generally indicates proper operation of anti-back-drive mechanism 114 and, more particularly, indicates sufficient frictional resistance between flange 122 and second ratchet gear 142 and proper one-way locking engagement between second ratchet pawl 144 and second ratchet gear 142.

Referring generally to FIG. 9 and particularly to, e.g., FIGS. 1, 4, and 5 for illustrative purposes only and not by way of limitation, the following portion of this paragraph delineates example 23 of the subject matter, disclosed herein. According to example 23, which encompasses example 22, above, trim actuator 102 further comprises first pin 148 that couples first ratchet pawl 126 to housing 140, and second pin 150 that couples second ratchet pawl 144 to housing 140. The step of (block 1014) measuring the first load, applied to first ratchet pawl 126 by first ratchet gear 124, comprises a step of (block 1020) measuring a first shear load, applied to first pin 148 by first ratchet pawl 126, using first shear sensor 152. The step of (block 1018) measuring the second load, applied to second ratchet pawl 144 by second ratchet gear 142, comprises a step of (block 1022)

measuring a second shear load, applied to second pin 150 by second ratchet pawl 144, using second shear sensor 154.

First shear sensor 152 enables measuring the first shear load, applied to first pin 148 by first ratchet pawl 126, to measure the internal loading of anti-back-drive mechanism 114 when the first force is applied to nut 108 in the first axial direction along power screw 106. Second shear sensor 154 enables measuring the second shear load, applied to second pin 150 by second ratchet pawl 144, to measure the internal loading of anti-back-drive mechanism 114 when the second force is applied to nut 108 in the second axial direction along power screw 106.

Referring generally to FIG. 9 and particularly to, e.g., FIGS. 1 and 6 for illustrative purposes only and not by way of limitation, the following portion of this paragraph delineates example 24 of the subject matter, disclosed herein. According to example 24, which encompasses example 22, above, the step of (block 1014) measuring the first load, applied to first ratchet pawl 126 by first ratchet gear 124, comprises a step of (block 1024) measuring a first torque, applied to first ratchet pawl 126 by first ratchet gear 124, using first torque sensor 156. The step of (block 1018) measuring the second load, applied to second ratchet pawl 144 by second ratchet gear 142, comprises a step of (block 1026) measuring a second torque, applied to second ratchet pawl 144 by second ratchet gear 142, using second torque sensor 158.

First torque sensor 156 enables measuring the first torque, applied directly to first ratchet pawl 126 by first ratchet gear 124, to measure the internal loading of anti-back-drive mechanism 114 when the first force is applied to nut 108 in the first axial direction along power screw 106. Second torque sensor 158 enables measuring the second torque, applied directly to second ratchet pawl 144 by second ratchet gear 142, to measure the internal loading of anti-back-drive mechanism 114 when the second force is applied to nut 108 in the second axial direction along power screw 106.

Referring generally to FIG. 9 and particularly to, e.g., FIGS. 1-8 for illustrative purposes only and not by way of limitation, the following portion of this paragraph delineates example 25 of the subject matter, disclosed herein. According to example 25, which encompasses any one of examples 21 to 24, above, method 1000 further comprises a step of (block 1028) preventing rotation of power screw 106 in the first rotational direction and in the second rotational direction.

Preventing rotation of power screw 106 in the first rotational direction and in the second rotational direction facilitates a hard stop of rotational motion of power screw 106.

In one or more examples, the step of (block 1028) is performed utilized brake 116. In these examples, brake 116 provides redundant prevention of rotational back-drive of power screw 106 (e.g., provides a redundant irreversibility function), such as when rotary actuator 104 is not actively driving rotational motion of power screw 106.

In one or more examples, the step of (block 1028) is performed utilizing lock 118. In these examples, lock 118 facilitates selective prevention of rotation of power screw 106 via mechanical engagement with power screw 106 and serves as a "parking brake," such as after moving horizontal stabilizer 210 into desired position or as an "emergency brake," such as upon improper operation of anti-back-drive mechanism 114 and brake 116.

Referring generally to FIG. 9 and particularly to, e.g., FIGS. 1-8 for illustrative purposes only and not by way of limitation, the following portion of this paragraph delineates example 26 of the subject matter, disclosed herein. According to example 26, which encompasses example 25, above, trim actuator 102 further comprises lock 118, configured to selectively engage flange 122 of power screw 106. The step of (block 1028) preventing rotation of power screw 106 in the first rotational direction and in the second rotational direction comprises a step of (block 1030) selectively preventing rotation of flange 122 using lock 118.

Selectively preventing rotation of flange 122 using lock 118 enables engagement of lock 118 with an existing structure of power screw 106 to prevent rotation of power screw 106.

Referring generally to FIG. 9 and particularly to, e.g., FIGS. 1, 5, 7, and 8 for illustrative purposes only and not by way of limitation, the following portion of this paragraph delineates example 27 of the subject matter, disclosed herein. According to example 27, which encompasses example 26, above, lock 118 comprises plurality of locking teeth 160, mounted circumferentially about flange 122. Lock 118 also comprises locking lever 162, configured to selectively engage or disengage plurality of locking teeth 160. The step of (block 1030) selectively preventing rotation of flange 122 using lock 118 comprises a step of (block 1032) selectively engaging locking lever 162 with plurality of locking teeth 160.

Selectively engaging locking lever 162 with plurality of locking teeth 160 enables engagement of lock 118 with flange 122 to facilitate mechanical coupling with power screw 106 via an existing structural component of power screw 106 at a plurality of rotational positions of power screw 106 to prevent further rotation of power screw 106 and, thus, fix the orientation of horizontal stabilizer 210.

Referring generally to FIG. 9 and particularly to, e.g., FIGS. 1, 7, and 8 for illustrative purposes only and not by way of limitation, the following portion of this paragraph delineates example 28 of the subject matter, disclosed herein. According to example 28, which encompasses example 27, above, method 1000 further comprises a step of (block 1034) rotating power screw 106 through the predetermined angle after selectively engaging locking lever 162 with plurality of locking teeth 160.

Rotating power screw 106 though the predetermined angle after selectively engaging locking lever 162 with plurality of locking teeth 160 provides clearance for engagement of locking lever 162 with plurality of locking teeth 160 while flange 122 is rotating.

In one or more examples, the step of (block 1034) rotating power screw 106 through the predetermined angle after selectively engaging locking lever 162 with plurality of locking teeth 160 is performed utilizing lost-motion mechanism 170.

Referring generally to FIG. 9 and particularly to, e.g., FIGS. 1, 7, and 8 for illustrative purposes only and not by way of limitation, the following portion of this paragraph delineates example 29 of the subject matter, disclosed herein. According to example 29, which encompasses example 28, above, method 1000 further comprises a step of (block 1036) damping a reaction force between lock 118 and flange 122 while rotating power screw 106 through the predetermined angle after selectively engaging locking lever 162 with plurality of locking teeth 160.

Damping the reaction force between lock 118 and flange 122 while rotating power screw 106 through the predetermined angle after selectively engaging locking lever 162 with plurality of locking teeth 160 absorbs shock between lock 118 and flange 122 when locking lever 162 engages plurality of locking teeth 160.

In one or more examples, the step of (block 1036) damping the reaction force between lock 118 and flange 122 while rotating power screw 106 through the predetermined angle, after selectively engaging locking lever 162 with plurality of locking teeth 160, is performed utilizing damper 176.

Figure 11:
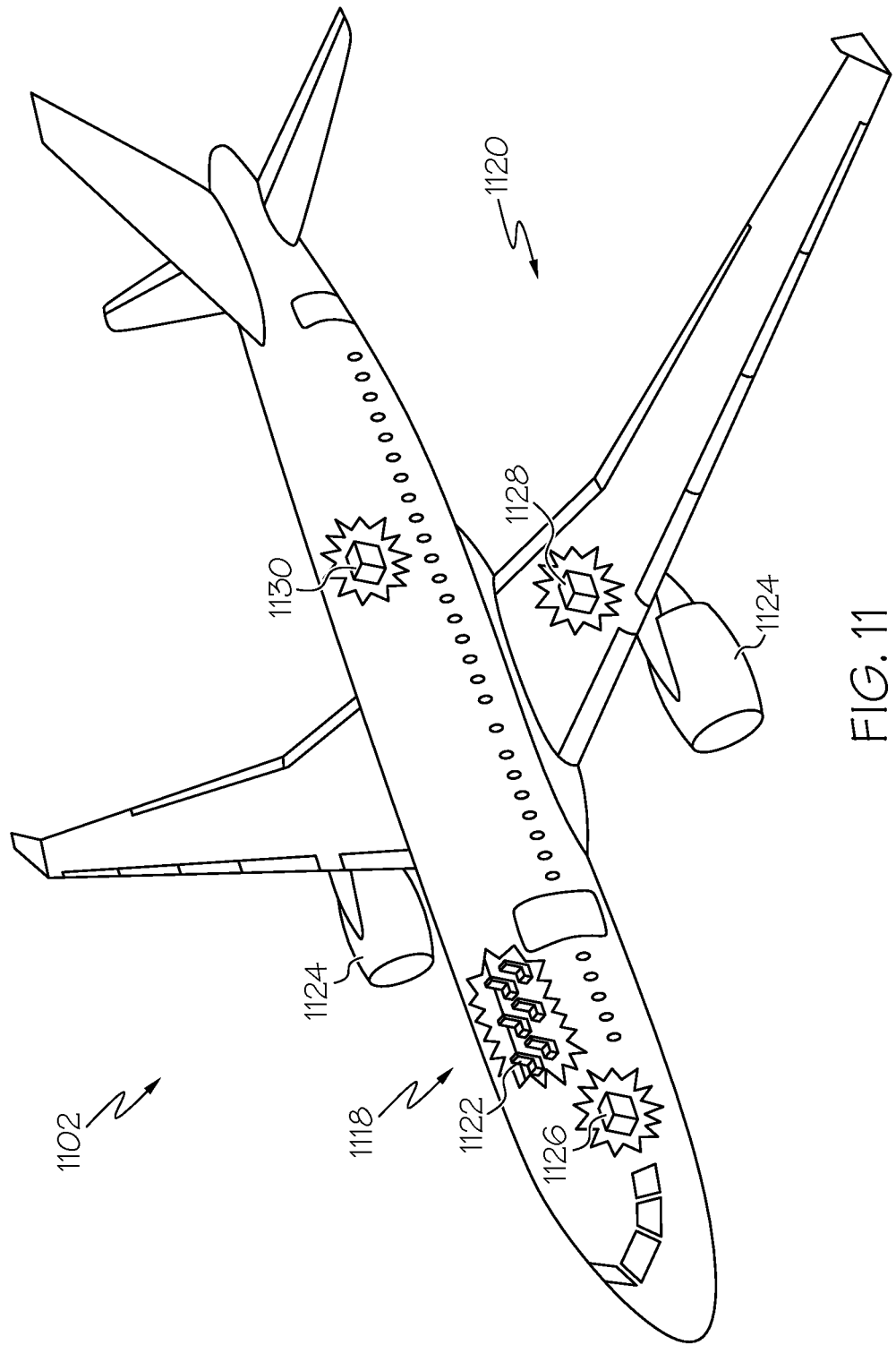
FIG. 11 is a schematic illustration of an aircraft.

Examples of the subject matter, disclosed herein may be described in the context of aircraft manufacturing and service method 1100 as shown in FIG. 10 and aircraft 1102 as shown in FIG. 11. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 11, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A trim actuator for a horizontal stabilizer of an aircraft, the trim actuator comprising:
    a power screw;
    a flange, concentric with the power screw and fixed to the power screw so that the flange rotates with the power screw;
    a rotary actuator, configured to rotate the power screw;
    a nut, configured to translate along the power screw when the power screw is rotated by the rotary actuator;
    an anti-back-drive mechanism, configured to prevent the power screw from rotating in a first rotational direction when a first force is applied to the nut in a first axial direction along the power screw and also configured to prevent the power screw from rotating in a second rotational direction, opposite the first rotational direction, when a second force is applied to the nut in a second axial direction, opposite the first axial direction;
    a sensor, configured to measure internal loading of the anti-back-drive mechanism when the first force is applied to the nut in the first axial direction along the power screw or when the second force is applied to the nut in the second axial direction, opposite the first axial direction; and
    a lock, configured to selectively prevent rotation of the power screw in the first rotational direction and in the second rotational direction, wherein the lock comprises:
        a plurality of locking teeth, located circumferentially on the flange; and
        a locking lever, configured to prevent the power screw from rotating in the first rotational direction and in the second rotational direction when the locking lever engages the plurality of locking teeth.

2. The trim actuator according to claim 1, further comprising a brake, configured to prevent the power screw from rotating upon deactivation of the rotary actuator.

3. The trim actuator according to claim 1, wherein the lock further comprises:
    a cam, configured to move the locking lever into engagement with the plurality of locking teeth; and
    a cam actuator, configured to drive the cam.

4. The trim actuator according to claim 1, wherein the locking lever is biased out of engagement from the plurality of locking teeth when the power screw is rotated in the first rotational direction and in the second rotational direction by the rotary actuator.

5. The trim actuator according to claim 1, wherein:
the lock further comprises an annular locking gear, mounted concentrically on the flange so that the annular locking gear rotates with the flange; and
the annular locking gear comprises the plurality of locking teeth.

6. The trim actuator according to claim 5, wherein the lock further comprises a lost-motion mechanism, configured to enable the flange to rotate through a predetermined angle relative to the annular locking gear after the locking lever engages the plurality of locking teeth.

7. The trim actuator according to claim 6, wherein:
the annular locking gear comprises an inner surface, opposite the plurality of locking teeth;
the lost-motion mechanism comprises:
a slot, formed on a circumference of the flange; and
a key, projecting from the inner surface of the annular locking gear and received in the slot; and
the slot and the key are sized so that rotational play exists between the annular locking gear and the flange.

8. The trim actuator according to claim 7, wherein the lost-motion mechanism further comprises a damper, located in the slot and configured to reduce shock loading of the slot and the key, associated with the rotational play between the annular locking gear and the flange.

9. The trim actuator according to claim 1, further comprising
a housing that contains the flange and the anti-back-drive mechanism,
wherein:
the flange comprises a flange first surface and a flange second surface, opposite the flange first surface;
the anti-back-drive mechanism comprises:
a first ratchet gear, concentrically mounted on the power screw so that the power screw is rotatable relative to the first ratchet gear, wherein the first ratchet gear comprises a first-ratchet-gear first surface, facing the flange first surface, and a first-ratchet-gear second surface, opposite the first-ratchet-gear first surface and facing the housing;
a first ratchet pawl that prevents the first ratchet gear from rotating in the first rotational direction when the first ratchet pawl engages the first ratchet gear;
a first friction device, located between the flange first surface and the first-ratchet-gear first surface; and
a first thrust bearing, located between the first-ratchet-gear second surface and the housing;
the first friction device is configured to form a frictional coupling between the flange and the first ratchet gear when the first force is applied to the nut in the first axial direction along the power screw, wherein the frictional coupling between the flange and the first ratchet gear opposes relative rotational motion between the flange and the first ratchet gear; and
the internal loading of the anti-back-drive mechanism, measured by the sensor when the first force is applied to the nut in the first axial direction along the power screw, is a first load, applied to the first ratchet pawl by the first ratchet gear.

10. The trim actuator according to claim 9, wherein:
the anti-back-drive mechanism further comprises:
a second ratchet gear, concentrically mounted on the power screw so that the power screw is rotatable relative to the second ratchet gear, wherein the second ratchet gear comprises a second-ratchet-gear first surface, facing the flange second surface, and a second-ratchet-gear second surface, opposite the second-ratchet-gear first surface and facing the housing;
a second ratchet pawl that prevents the second ratchet gear from rotating in the second rotational direction when the second ratchet pawl engages the second ratchet gear;
a second friction device, located between the flange second surface and the second-ratchet-gear first surface; and
a second thrust bearing, located between the second-ratchet-gear second surface and the housing;
the second friction device is configured to form a frictional coupling between the flange and the second ratchet gear when the second force is applied to the nut in the second axial direction along the power screw, wherein the frictional coupling between the flange and the second ratchet gear opposes relative rotational motion between the flange and the second ratchet gear; and
the internal loading of the anti-back-drive mechanism, measured by the sensor when the second force is applied to the nut in the second axial direction along the power screw, is a second load applied to the second ratchet pawl by the second ratchet gear.

11. The trim actuator according to claim 10, further comprising:
a first pin that couples the first ratchet pawl to the housing; and
a second pin that couples the second ratchet pawl to the housing,
wherein the sensor comprises:
a first shear sensor, configured to measure a first shear load, applied to the first pin by the first ratchet pawl when the first force is applied to the nut in the first axial direction along the power screw; and
a second shear sensor, configured to measure a second shear load, applied to the second pin by the second ratchet pawl when the second force is applied to the nut in the second axial direction along the power screw.

12. The trim actuator according to claim 10, wherein the sensor comprises:
a first torque sensor, configured to measure a first torque, applied to the first ratchet pawl by the first ratchet gear when the first force is applied to the nut in the first axial direction along the power screw; and
a second torque sensor, configured to measure a second torque, applied to the second ratchet pawl by the second ratchet gear when the second force is applied to the nut in the second axial direction along the power screw.

13. A method of using the trim actuator according to claim 10 to control the horizontal stabilizer of the aircraft, the method comprising steps of:
frictionally coupling the power screw with the anti-back-drive mechanism to prevent rotation of the power screw in the first rotational direction when the first force is applied to the nut in the first axial direction along the power screw;
frictionally coupling the power screw with the anti-back-drive mechanism to prevent rotation of the power screw in the second rotational direction, opposite the first rotational direction, when the second force is applied to the nut in the second axial direction, opposite the first axial direction; and
measuring the internal loading of the anti-back-drive mechanism when the first force is applied to the nut in the first axial direction along the power screw and when the second force is applied to the nut in the second axial direction, opposite the first axial direction, using the sensor.

14. The method according to claim 13, wherein:
the step of frictionally coupling the power screw with the anti-back-drive mechanism to prevent rotation of the power screw in the first rotational direction when the first force is applied to the nut in the first axial direction along the power screw comprises:
   engaging the first ratchet pawl with the first ratchet gear to prevent the first ratchet gear from rotating in the first rotational direction; and
   frictionally coupling the first ratchet gear with the flange via the first friction device to oppose relative rotational motion between the flange and the first ratchet gear; and
the step of measuring the internal loading of the anti-back-drive mechanism when the first force is applied to the nut in the first axial direction along the power screw comprises a step of measuring a first load, applied to the first ratchet pawl by the first ratchet gear.

15. The method according to claim 14, further comprising a step of preventing rotation of the power screw in the first rotational direction and in the second rotational direction.

16. The method according to claim 14, wherein:
the step of frictionally coupling the power screw with the anti-back-drive mechanism to prevent rotation of the power screw in the second rotational direction, which is opposite the first rotational direction, when the second force is applied to the nut in the second axial direction, opposite the first axial direction, comprises:
   engaging the second ratchet pawl with the second ratchet gear to prevent the second ratchet gear from rotating in the second rotational direction; and
   frictionally coupling the second ratchet gear with the flange via the second friction device to oppose relative rotational motion between the flange and the second ratchet gear; and
the step of measuring the internal loading of the anti-back-drive mechanism when the second force is applied to the nut in the second axial direction along the power screw comprises a step of measuring the second load, applied to the second ratchet pawl by the second ratchet gear.

17. The method according to claim 16, wherein:
the trim actuator further comprises:
   a first pin that couples the first ratchet pawl to the housing; and
   a second pin that couples the second ratchet pawl to the housing,
the step of measuring the first load, applied to the first ratchet pawl by the first ratchet gear, comprises measuring a first shear load, applied to the first pin by the first ratchet pawl, using a first shear sensor; and
the step of measuring the second load, applied to the second ratchet pawl by the second ratchet gear, comprises measuring a second shear load, applied to the second pin by the second ratchet pawl, using a second shear sensor.

18. The method according to claim 16, wherein:
the step of measuring the first load, applied to the first ratchet pawl by the first ratchet gear, comprises measuring a first torque, applied to the first ratchet pawl by the first ratchet gear, using a first torque sensor; and
the step of measuring the second load, applied to the second ratchet pawl by the second ratchet gear, comprises measuring a second torque, applied to the second ratchet pawl by the second ratchet gear, using a second torque sensor.

19. A trim actuator for a horizontal stabilizer of an aircraft, the trim actuator comprising:
   a rotatable power screw;
   a flange, concentric with the power screw and fixed to the power screw so that the flange rotates with the power screw;
   a nut, configured to translate along the power screw when the power screw is rotated;
   an anti-back-drive mechanism, configured to prevent the power screw from rotating in a first rotational direction when a first force is applied to the nut in a first axial direction along the power screw and also configured to prevent the power screw from rotating in a second rotational direction, opposite the first rotational direction, when a second force is applied to the nut in a second axial direction, opposite the first axial direction;
   a plurality of locking teeth, located circumferentially on the flange; and
   a locking lever, configured to selectively prevent the power screw from rotating in the first rotational direction and in the second rotational direction when the locking lever engages the plurality of locking teeth.

20. The trim actuator of claim 19, further comprising:
   an annular locking gear, mounted concentrically on the flange so that the annular locking gear rotates with the flange, wherein the annular locking gear comprises the plurality of locking teeth; and
   a lost-motion mechanism, configured to enable the flange to rotate through a predetermined angle relative to the annular locking gear after the locking lever engages the plurality of locking teeth.

* * * * *